United States Patent
Vaidya et al.

(10) Patent No.: US 11,863,999 B2
(45) Date of Patent: Jan. 2, 2024

(54) APPARATUS AND METHODS FOR INTERFERENCE DETECTION AND HANDLING WITHIN UNLICENSED SPECTRUM

(71) Applicant: Charter Communications Operating, LLC

(72) Inventors: Maulik Vaidya, Escondido, CA (US); Ahmad Reza Hedayat, Carlsbad, CA (US); Amitav Mukherjee, Elk Grove, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/728,648

(22) Filed: Apr. 25, 2022

(65) Prior Publication Data
US 2022/0256352 A1     Aug. 11, 2022

Related U.S. Application Data

(63) Continuation of application No. 16/837,751, filed on Apr. 1, 2020, now Pat. No. 11,317,296.
(Continued)

(51) Int. Cl.
*H04W 16/14*     (2009.01)
*H04W 74/08*     (2009.01)
(Continued)

(52) U.S. Cl.
CPC ........... *H04W 16/14* (2013.01); *H04W 68/02* (2013.01); *H04W 72/0453* (2013.01);
(Continued)

(58) Field of Classification Search
CPC ..... H04W 16/14; H04W 76/27; H04W 68/02; H04W 72/0453; H04W 72/082;
(Continued)

(56) References Cited

U.S. PATENT DOCUMENTS

| 5,991,308 A | 11/1999 | Fuhrmann et al. |
| 5,995,499 A | 11/1999 | Hottinen et al. |

(Continued)

FOREIGN PATENT DOCUMENTS

| EP | 2294860 B1 | 4/2017 |
| EP | 3741168 A1 | 11/2020 |

(Continued)

OTHER PUBLICATIONS

IEEE Std. 802.11 (1997), or related standards including 802.11 a/b/g/n/s/v/ac/ad/ax/ay/ba or 802.11-2012/2013, 802.11-2016, 459 pages.

(Continued)

*Primary Examiner* — Mewale A Ambaye
(74) *Attorney, Agent, or Firm* — Patent Beach PC

(57) ABSTRACT

Apparatus and methods for operating wireless devices using unlicensed frequency ranges with minimal transmission interruptions. In one embodiment, the apparatus and methods provide a mechanism for redirecting idle or inactive wireless devices to different frequencies in response to interference detection such as by 5 GHz-band radar. In one variant, the present disclosure provides methods and apparatus for allowing user device (UEs) using 5G NR-U spectrum to continue to operate upon radar detection by successfully switching the UEs to one or more frequencies that are free of radar operation. In one variant, a gNB controlling the UEs informs the AMF (access and mobility function) of a radar detection event, and the AMF initiates a paging towards idle UEs in order to allow the gNB to move the UEs (Continued)

to a frequency without radar operations. In another variant, a gNB switches its UEs to a different frequency without relying on the AMF.

20 Claims, 19 Drawing Sheets

Related U.S. Application Data

(60) Provisional application No. 62/909,548, filed on Oct. 2, 2019.

(51) Int. Cl.
*H04W 76/27* (2018.01)
*H04W 68/02* (2009.01)
*H04W 72/0453* (2023.01)
*H04W 72/541* (2023.01)

(52) U.S. Cl.
CPC ..... *H04W 72/541* (2023.01); *H04W 74/0808* (2013.01); *H04W 76/27* (2018.02)

(58) Field of Classification Search
CPC . H04W 74/0808; H04W 72/04; H04W 72/12; H04W 52/48
See application file for complete search history.

(56) References Cited

U.S. PATENT DOCUMENTS

| | | |
|---|---|---|
| 6,154,648 A | 11/2000 | Comer |
| 6,356,560 B1 | 3/2002 | Venters et al. |
| 6,771,953 B1 | 8/2004 | Chow et al. |
| 6,782,262 B1 | 8/2004 | Lundborg |
| 7,266,726 B1 | 9/2007 | Ladd et al. |
| 8,024,607 B2 | 9/2011 | Ladd et al. |
| 8,046,636 B2 | 10/2011 | Ladd et al. |
| 8,302,111 B2 | 10/2012 | Ladd et al. |
| 8,321,723 B2 | 11/2012 | Ladd et al. |
| 8,799,723 B2 | 8/2014 | Ladd et al. |
| 8,997,136 B2 | 3/2015 | Brooks et al. |
| 9,258,809 B2 | 2/2016 | Liao et al. |
| 9,386,496 B2 | 7/2016 | Gupta et al. |
| 9,526,056 B2 | 12/2016 | Tomici et al. |
| 9,699,663 B1 | 7/2017 | Jovancevic |
| 9,769,692 B2 | 9/2017 | Freda et al. |
| 9,807,778 B2 | 10/2017 | Ma et al. |
| 9,813,148 B2 | 11/2017 | Syed et al. |
| 9,887,864 B1 | 2/2018 | Han et al. |
| 10,098,568 B2 | 10/2018 | Gazdzinski |
| 10,135,730 B2 | 11/2018 | Chou |
| 10,340,976 B2 | 7/2019 | Kakinada et al. |
| 10,405,192 B2 | 9/2019 | Kakinada et al. |
| 10,484,876 B2 | 11/2019 | Shah et al. |
| 10,492,204 B2 | 11/2019 | Kakinada et al. |
| 10,499,409 B2 | 12/2019 | Shattil |
| 10,506,456 B2 | 12/2019 | Lou et al. |
| 10,531,309 B1 | 1/2020 | Li et al. |
| 10,536,859 B2 | 1/2020 | Gunasekara et al. |
| 10,680,883 B2 | 6/2020 | Hall et al. |
| 10,805,562 B2 | 10/2020 | Nakamura et al. |
| 10,980,025 B2 | 4/2021 | Hmimy et al. |
| 11,026,205 B2 | 6/2021 | Hmimy et al. |
| 11,129,171 B2 | 9/2021 | Hmimy |
| 11,190,861 B2 | 11/2021 | Bali |
| 11,219,026 B2 | 1/2022 | Kakinada et al. |
| 11,363,466 B2 | 6/2022 | Khalid et al. |
| 11,432,284 B2 | 8/2022 | Hmimy et al. |
| 11,438,771 B2 | 9/2022 | Syed et al. |
| 11,457,485 B2 | 9/2022 | Khalid et al. |
| 2002/0126748 A1 | 9/2002 | Rafie et al. |
| 2004/0001021 A1 | 1/2004 | Choo et al. |
| 2004/0196834 A1 | 10/2004 | Ofek et al. |
| 2006/0188004 A1 | 8/2006 | Kizu et al. |
| 2008/0097913 A1 | 4/2008 | Dicks et al. |
| 2008/0220786 A1 | 9/2008 | Beacham |
| 2008/0220788 A1 | 9/2008 | Stanwood et al. |
| 2009/0034443 A1 | 2/2009 | Walker et al. |
| 2009/0129273 A1* | 5/2009 | Zou ........ H04W 36/06 370/235 |
| 2009/0253438 A1 | 10/2009 | Chater-Lea et al. |
| 2010/0094956 A1 | 4/2010 | Zuckerman et al. |
| 2010/0128608 A1 | 5/2010 | Zou et al. |
| 2010/0234042 A1 | 9/2010 | Chan et al. |
| 2011/0014924 A1 | 1/2011 | Hwang et al. |
| 2011/0292970 A1 | 12/2011 | Lansford et al. |
| 2013/0122903 A1 | 5/2013 | Farnsworth et al. |
| 2013/0182602 A1* | 7/2013 | Lee ........ H04J 11/003 370/252 |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0106672 A1 | 4/2014 | Jeon et al. |
| 2014/0194068 A1 | 7/2014 | Coppage et al. |
| 2014/0241187 A1* | 8/2014 | Barkay ........ H04W 76/23 370/252 |
| 2014/0269526 A1 | 9/2014 | Mitola, III |
| 2014/0308986 A1 | 10/2014 | Yang et al. |
| 2015/0055623 A1 | 2/2015 | Li et al. |
| 2015/0071239 A1 | 3/2015 | Zhang et al. |
| 2015/0208262 A1 | 7/2015 | Siomina |
| 2015/0280847 A1 | 10/2015 | Somasundaram et al. |
| 2015/0334664 A1 | 11/2015 | Sawai et al. |
| 2015/0341753 A1 | 11/2015 | Chen et al. |
| 2016/0007147 A1 | 1/2016 | Zhang et al. |
| 2016/0073259 A1 | 3/2016 | Lee et al. |
| 2016/0128001 A1 | 5/2016 | Tsuda |
| 2016/0165066 A1 | 6/2016 | Yang et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0330743 A1 | 11/2016 | Das et al. |
| 2016/0381600 A1 | 12/2016 | Aksu |
| 2017/0013422 A1* | 1/2017 | Saiwai ........ H04W 4/06 |
| 2017/0026203 A1 | 1/2017 | Thomas et al. |
| 2017/0155703 A1 | 6/2017 | Hao et al. |
| 2017/0164326 A1* | 6/2017 | Worrall ........ H04W 72/0406 |
| 2017/0208540 A1 | 7/2017 | Egner et al. |
| 2017/0257750 A1 | 9/2017 | Gunasekara et al. |
| 2017/0272955 A1 | 9/2017 | Sadek et al. |
| 2017/0295497 A1 | 10/2017 | MacMullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2018/0007587 A1 | 1/2018 | Feldman et al. |
| 2018/0049036 A1 | 2/2018 | Sethi et al. |
| 2018/0063736 A1 | 3/2018 | Sadeghi et al. |
| 2018/0063758 A1* | 3/2018 | Velu ........ H04W 48/16 |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2018/0352386 A1 | 12/2018 | Gunasekara et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |

(56) References Cited

U.S. PATENT DOCUMENTS

| | | |
|---|---|---|
| 2019/0098632 A1 | 3/2019 | Martin et al. |
| 2019/0104551 A1 | 4/2019 | Deenoo et al. |
| 2019/0150182 A1 | 5/2019 | Koorapaty et al. |
| 2019/0182895 A1 | 6/2019 | Di Girolamo et al. |
| 2019/0222266 A1 | 7/2019 | Cui et al. |
| 2019/0230613 A1 | 7/2019 | Kim et al. |
| 2019/0239190 A1 | 8/2019 | Patel et al. |
| 2019/0296789 A1 | 9/2019 | Yu et al. |
| 2019/0319814 A1 | 10/2019 | Das |
| 2019/0320490 A1 | 10/2019 | Liu et al. |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0393926 A1 | 12/2019 | Kakinada et al. |
| 2019/0394790 A1 | 12/2019 | Damnjanovic et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0083892 A1 | 3/2020 | Kundu et al. |
| 2020/0084759 A1 | 3/2020 | Liu et al. |
| 2020/0146058 A1 | 5/2020 | Xu et al. |
| 2020/0187150 A1 | 6/2020 | Eisner |
| 2020/0221392 A1 | 7/2020 | Xue et al. |
| 2020/0228993 A1 | 7/2020 | Gunasekara |
| 2020/0252933 A1 | 8/2020 | Hmimy et al. |
| 2020/0275457 A1 | 8/2020 | Hmimy |
| 2020/0344515 A1 | 10/2020 | Wong et al. |
| 2021/0026711 A1 | 1/2021 | Ovadia et al. |
| 2021/0051653 A1 | 2/2021 | Park et al. |
| 2021/0076424 A1 | 3/2021 | Mukherjee et al. |
| 2021/0126662 A1 | 4/2021 | Solichien |
| 2021/0127423 A1 | 4/2021 | Park et al. |
| 2021/0136838 A1 | 5/2021 | Khalid et al. |
| 2021/0204322 A1 | 7/2021 | Lou et al. |
| 2021/0219143 A1 | 7/2021 | Khalid et al. |
| 2021/0219303 A1 | 7/2021 | Khalid et al. |
| 2021/0235495 A1 | 7/2021 | Xu et al. |
| 2021/0258868 A1 | 8/2021 | Wong et al. |
| 2021/0266914 A1 | 8/2021 | Yoo et al. |
| 2021/0274499 A1 | 9/2021 | Hmimy et al. |
| 2021/0274506 A1 | 9/2021 | Raghavan et al. |
| 2021/0297979 A1 | 9/2021 | Hmimy et al. |
| 2021/0376905 A1 | 12/2021 | Zhou et al. |
| 2022/0007200 A1 | 1/2022 | Sevindik et al. |
| 2022/0007374 A1 | 1/2022 | Sevindik et al. |
| 2022/0167176 A1 | 5/2022 | Khalid |
| 2022/0183093 A1 | 6/2022 | Sevindik et al. |
| 2022/0191675 A1 | 6/2022 | Mukherjee |

FOREIGN PATENT DOCUMENTS

| | | |
|---|---|---|
| GB | 2585394 A | 1/2021 |
| JP | 2021510973 A | 4/2021 |
| KR | 20140070528 A | 6/2014 |
| WO | WO-2013020599 A1 | 2/2013 |
| WO | WO-2017130494 A1 | 8/2017 |
| WO | WO-2017186294 A1 | 11/2017 |
| WO | WO-2019140461 A1 | 7/2019 |
| WO | WO-2019226838 A1 | 11/2019 |
| WO | WO-2020160403 A1 | 8/2020 |
| WO | WO-2021050957 A1 | 3/2021 |
| WO | WO-2021067810 A1 | 4/2021 |
| WO | WO-2021086986 A1 | 5/2021 |

OTHER PUBLICATIONS

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

Souryal, Michael R., et al., "Effect of Federal Incumbent Activity on CBRS Commercial Service", International Symposium on Dynamic Spectrum Access Networks (DySPAN), IEEE 2019, 5 pages.

Wi-Fi Direct, "Wi-Fi Peer-to-Peer (P2P) Specification," Wi-Fi Alliance, Version 1.5, 2014, 183 pages.

* cited by examiner

APPARATUS AND METHODS FOR INTERFERENCE DETECTION AND HANDLING WITHIN UNLICENSED SPECTRUM

PRIORITY

This application is a continuation of, and claims priority to, U.S. patent application Ser. No. 16/837,751 of the same title filed on Apr. 1, 2020, and issuing as U.S. Pat. No. 11,317,296 on Apr. 26, 2022, which claims priority benefit of U.S. Provisional Patent Application Ser. No. 62/909,548 entitled "APPARATUS AND METHODS FOR INTERFERENCE HANDLING IN WIRELESS SYSTEMS" filed Oct. 2, 2019, each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to interference detection and handling (e.g., for weather or other radars) within unlicensed RF spectrum (e.g., that utilized by 3GPP 5G NR-U or MulteFire systems).

2. Description of Related Technology

5G New Radio (NR) and NG-RAN (Next Generation Radio Area Network)

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, Release 15 NG-RAN leverages some technology and functions of extant LTE/LTE-A technologies (colloquially referred to as 4G or 4.5G), as bases for further functional development and capabilities. However, numerous different and new architectural features are employed in 5G. Specifically, the NG-RAN (5G) System architecture is designed to support data connectivity and services offering with higher throughput and lower latency than 4G or 4.5G.

FIG. 1A shows the 5G architecture 100 as defined in 3GPP TS 23.501 (FIG. 4.2.3-1 thereof).

An existing 3GPP LTE/LTE-A/EPC (i.e., 4G or 4.5G system) cannot be updated to support 5G; hence, 3GPP has also defined interworking procedures between such 4G/4.5G and 5G systems. FIG. 1B shows the architecture 101 for interworking between 5GS and EPC/E-UTRAN as defined in TS 23.501 (FIG. 4.3.1-1 thereof), specifically the non-roaming architecture for interworking between the 5GS and the EPC/E-UTRAN. Two different RAN technologies are supported; i.e., E-UTRAN (4G/4.5G) 102, and 5G (NG-RAN) 104.

In LTE and 5G NR, for a given cell, the cognizant eNB/gNB broadcasts a Physical Cell ID (PCI). The Physical Cell ID is the identification of a cell at the physical layer (PHY). Typically, the UE 122 performs Measurement Reporting, under network directive, based on detected PCIs for a given EARFCN (E-UTRA Absolute Radio Frequency Channel Number) or frequency/set of frequencies.

Unlicensed Spectrum

Various unlicensed spectrum is available worldwide for commercial use. Unlicensed technologies such as IEEE's 802.11 a/-n/ac/ax, 3GPP's LTE LAA/eLAA/FeLAA, and 3GPP's NR-U (NR-Unlicensed) employ, for example, the 5 GHz-band spectrum. In particular, in the United States, this spectrum is shared with Federal radar systems (e.g. TWDR). Other countries may use the 5 GHz and/or other unlicensed spectrum.

At the time of introduction of Wi-Fi (various versions of IEEE Std. 802.11), IEEE had to devise mechanisms to ensure that Wi-Fi APs/STAs (access points/stations) either did not operate in frequencies identified as being used by radars or immediately vacated identified frequencies in case of ongoing Wi-Fi transmissions. The resulting mechanism was a feature termed as "Dynamic Frequency Selection" (DFS). DFS is a mechanism that detects the presence of radar signals and dynamically guides a transmitter to switch to another channel whenever a particular condition is met. Prior to the start of any transmission, an Unlicensed National Information Infrastructure (U-NII) device equipped with DFS capability (e.g. Wi-Fi APs) must continually monitor the radio environment for radar's presence. If the U-NII device determines that a radar signal is present, it must either switch to another channel to avoid interference with the radar or go into "sleep mode" if no other channel is available.

3GPP is presently defining NR-Unlicensed (NR-U) to operate in a variety of unlicensed spectrums, with the 5 GHz-band included. In order to maintain regulatory compliance, NR-U therefore must provide a mechanism to allow continued operations of incumbent federal radar systems while minimizing transmission interruption for NR-U.

It is noted that 3GPP LTE LAA did not require any specific mechanisms to support this functionality, due to the presence of a licensed carrier as its primary channel.

FCC's Regulatory Requirements for 5 GHz for Incumbent Radar Systems

DFS is a mechanism to allow (outdoor) unlicensed devices to operate in 5 GHz frequency bands which have been allocated to radar systems without causing interference within those radar systems. A DFS-enabled device monitors the channel it operates at and if radar signals detected, the device will vacate that channel and switch to an alternate channel automatically. In addition, the channel in which radars are detected will not be used for a period of time.

The FCC issued a Notice of Proposed Rulemaking (NPRM FCC 03-110, 2003) requiring DFS and transmit power control to operate a wireless device operating in, for example, the 5470-5725 MHz band in the United States. Test parameters for DFS are in Order FCC 06-96. There are also DFS requirements for portions of the 5 GHz unlicensed spectrum in other countries specified by respective regulatory agencies thereof. Hence, this issue of de-conflicting with Federal radars and other such systems exists in other countries as well.

The FCC requirements for protecting radar channels are defined with respect to the following terms:

Channel Availability Check Time: The time a system shall monitor a channel for presence of radar prior to initiating a communications link on that channel.

Interference Detection Threshold: The minimum signal level, assuming a 0 dBi antenna, that can be detected by the system to trigger the move to another channel.

Channel Move Time: The time for the system to clear the channel and measured from the end of the radar burst to the end of the signal transmission on the channel.

Channel Closing Transmission Time: The total transmission time from the system during the channel move time.

Non-Occupancy Time: Time after radar is detected on a channel that the channel may not be used.

Master Device: Device that has radar detection capabilities and can control other devices in the network (e.g. an Access Point would be considered a master device).

Client Device: Device that does not initiate communications on a channel without authorization from a master device.

The above parameters may differ under various regulatory domains, however some typical values may be: CAC Channel availability time=60 sec, Channel Move Time=10 sec, Channel Closing Transmission Time=1 sec, non-occupancy period=30 minutes.

According to regulatory requirements, a master device (e.g. an AP or base station) performs the radar detection on behalf of all the devices within that have associated with that master device. The implications of this include: a) if a client device (e.g. Wi-Fi station or UE) loses connection to the master device, it shall not transmit anything to gain access to its master node or another master node in the same channel (or another channel that requires DFS capability). The communications between master node and clients has to be sufficiently fast to meet the requirement that the device may only transmit for a total of 260 ms (Channel Closing Transmission Time) during a period of maximum 10 sec (Channel Move Time) after detection of a radar signal. A relatively slow connection will leave the master node little time for coordinating channel changes with its clients.

DFS Operation in 5 GHz Spectrum and Related IEEE Std. 802.11 Procedures

With respect to 802.11 a/n/ac's DFS features, the specific 20 MHz-wide wireless LAN channels and the equivalent frequencies are as follows (determined by the formula fc=5000 MHz+(5×channel number)):

UNII-2 channels are 52, 56, 60, 64 (center frequency 5260, 5280, 5300, 5320 MHz)

UNII-2 extended channels are 100, 104, 108, 112, 116, 120, 124, 128, 132, 136, 140 (center frequency at 5500, 5520, 5540, 5560, 5580, 5600, 5620, 5640, 5660, 5680, 5700 MHz)

In the Wi-Fi ecosystem, APs usually have the complexity to perform radar detection functions and in the event of detection of a radar signal, an AP instructs its associated stations to immediately move to another channel. IEEE Std. 802.11h addresses this requirement by adding support for DFS and transmit power control on every DFS-required channel.

Once an AP detects radar on operating channel, a channel switch announcement (CSA) element ID will be included in beacons and probe responses to instruct the STA (here, a "slave") to move to a new channel. The exemplary CSA Element ID includes the following fields: (i) element ID, (ii) length, (iii) channel switch mode, (iv) new channel number, and (iv) channel switch count. The slave device should respond to the CSA element by checking its parameters. If the Channel switch mode is SET, the slave device stops transmissions to the AP. Conversely, if the Channel switch mode is CLEAR, the slave does not have any dependency on the AP for its operation.

Various Physical Channels for PCell/PSCell in 3 GPP NR-U

The channels subject to DFS for operation of LTE-LAA (Licensed Assisted Access) and NR-U devices are channels within 46B and 46C. Table 1 shows the sub-bands within Band 46. Corresponding channel(s) for NR are expected to be defined as part of the ongoing NR-U WID.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ |
|---|---|---|
| 46A | 5150 MHz-5250 MHz | 5150 MHz-5250 MHz |
| 46B | 5250 MHz-5350 MHz | 5250 MHz-5350 MHz |
| 46C | 5470 MHz-5725 MHz | 5470 MHz-5725 MHz |
| 46D | 5725 MHz-5925 MHz | 5725 MHz-5925 MHz |

As described above, for NR-U to operate in the 5 GHz band in the U.S., it must support FCC's Title 47 Part 15 CFR. As noted, for IEEE's Wi-Fi technology, DFS provides the necessary mechanism for this support. However, NR-U needs to have some mechanism as well, which is presently undefined in the standards (e.g., Rel.-15 and 16).

Because NR-U is a synchronous scheduled system, an NR-U UE generally cannot initiate transmissions without the knowledge of the gNB. An NR-U UE can operate in one of three RRC states, as shown in FIG. 1C:

1. RRC_CONNECTED
2. RRC_IDLE
3. RRC_INACTIVE

For UEs in the RRC_CONNECTED state, a handover mechanism exists which may be adapted to provide the necessary information for a UE in active transmission/reception to shift the transmission/reception to frequencies not used by any radar equipment. However, this mechanism is not optimized for such functionality.

Moreover, no mechanism currently exists to inform UEs in RRC_IDLE or RRC_INACTIVE states of such radar detection events, and the expected or necessary actions from the UEs.

Accordingly, improved apparatus and methods are needed to, inter alia, detect and manage interfering signals such as e.g., 5 GHz-band weather radars, in wireless systems, including most notably idle or inactive wireless devices operating in unlicensed spectrums (e.g., in NR-U).

SUMMARY

The present disclosure addresses the foregoing needs by providing, inter alia, methods and apparatus for operating wireless devices using unlicensed spectrum during and subsequent to interference detection events. In one aspect, the disclosure provides methods and apparatus for switching operating frequencies for devices being supported by a 5G gNB operating in NR-U (New Radio-Unlicensed) during radar detection.

In one aspect, a method for managing detection of interference in a first frequency channel being used in a wireless access network by a wireless access node and one or more wireless user devices connected to the wireless access network through the wireless access node. In one embodiment, the method includes detecting wireless interference in the first frequency, selecting a second frequency that is free of interference, and switching the one or more wireless user devices from the first frequency to the second frequency. In one variant, the one or more wireless user devices are initially in an idle or inactive mode.

In one implementation, the method includes: i) sending a paging signal to the one or more wireless user devices to cause the one or more wireless user devices to transition to connected/active mode; and then ii) sending a signal to the one or more wireless user devices to switch to the second frequency. In one specific configuration, the paging signal and transition to connected mode includes a 5G 3GPP compliant paging procedure (i.e., using RRCSetup); the signal to switch to the second frequency is performed using 5G 3GPP compliant frequency change procedure (i.e., using an RRCRelease message); and the paging signal is initiated by the access and mobility management function (AMF).

In another implementation, the method includes: sending a redirect message to the one or more wireless user devices from the wireless access node (e.g., a gNB) without first "waking up" (switching to connected/active mode) of the one or more wireless user devices. In one implementation, the redirect message is configured to signal the one or more wireless user devices to switch their connection to the wireless network from the first frequency to the second frequency.

In another variant, the method includes monitoring a physical redirect channel for the redirect message, the monitoring performed by the one or more wireless user devices. In one variant, the one or more wireless user devices perform the monitoring while in the idle or inactive modes. In one implementation, the monitoring is performed periodically; e.g., is performed at a predetermined monitoring frequency. In one particular configuration, the predetermined monitoring frequency depends on a frequency of monitoring of a paging channel (e.g., 3GPP defined paging). For example, in various approaches: i) the redirect channel monitoring is performed every time that a paging channel monitoring is performed (e.g., at time of paging monitoring, plus or minus t ms), ii) the redirect channel monitoring is performed every N times that the paging channel monitoring is performed, and/or iii) paging channel and redirect channel monitoring are performed at different time domains, according to a predetermined schedule.

In one implementation, the monitoring frequency is provided to the one or more wireless user devices by the wireless access node. The monitoring frequency may depend on historical interference data. In one configuration, the historical interference data includes the number of times that interference is detected in a particular channel frequency band (first frequency band) within a time period. In another configuration, the historical data may include the frequency of interference signals during particular days of the week, days of the month, times of day, types of day (weekend, weekday), etc. The historical data may also include the frequency of interference signals within particular frequency bands (e.g., frequency bands 1 and 2 rarely get radar interference, frequency band 3 is often busy on the weekends, etc.), such as via histogram or other data structure. For example, based on a history of infrequent (or nonexistent) interference within a first frequency channel, the wireless access node may instruct the wireless user devices operating on the first frequency channel to monitor the redirect channel at a lower frequency or periodicity.

In one embodiment, the aforementioned wireless access node is a 5G gNB. In another embodiment, the wireless access node is a Wi-Fi AP (access point). In one embodiment, the first frequency channel and the second frequency channel are at least in part located in an unlicensed frequency spectrum. In one variant, the unlicensed frequency spectrum is the NR-U spectrum, such as the unlicensed frequency spectrum is the 5 GHz spectrum.

In one variant, the unlicensed frequency spectrum is a wireless spectrum used by Wi-Fi systems.

In one embodiment, the interference detection includes radar signal detection in the first frequency channel, and the selecting a second frequency that is free of interference includes checking a list of pre-selected frequency bands for interference. In one variant thereof, the pre-selected list frequency bands include all or some of the other frequency bands available to the wireless access node on the unlicensed spectrum. In another variant, the list of pre-selected frequency bands is at least partially based on the historical interference data. In one implementation, the list of pre-selected frequency bands is tiered or ordered, based on a prioritization structure, or based on historical interference data (e.g., frequency channels more likely to be currently free are checked first).

In another aspect, a method of redirecting one or more wireless user devices within a wireless access network from a first channel to a second channel is disclosed. In one embodiment, the one or more wireless user devices are initially in idle or inactive state, and the first and second frequency channels are in an unlicensed frequency spectrum. In one variant, the unlicensed frequency spectrum is part of the NR-U spectrum; e.g., 5 GHz spectrum, and the wireless access network is at least in part working in NR-U standalone deployment.

In another aspect, a method of operating a wireless user device in a wireless network is disclosed. In one embodiment, the wireless user device is configured to perform channel frequency redirect in response to channel interference detection. In one variant, the wireless user device is connected to a wireless access node of the wireless network through a channel within an unlicensed frequency spectrum; e.g., 5 GHz NR-U spectrum. In one implementation, the channel interference detection includes detection of radar signal(s) in the frequency channel being used by the wireless user device, the latter being an idle or inactive wireless user device. In one variant, the method further includes monitoring a redirect channel for a redirect message.

In yet another aspect, a method of conserving power in one or more wireless user devices connected to a wireless network through a wireless access node is disclosed. In one embodiment, the user devices are configured for performing channel frequency redirect in response to an interference detection, and the method includes monitoring a physical redirect channel for a frequency redirect message. In one variant, the monitoring is performed periodically, and the wireless user devices are otherwise idle or inactive so as to conserve power. The monitoring is performed at e.g., a predetermined monitoring frequency provided to the wireless user devices by the wireless access node. In another variant, the monitoring frequency is calculated/established using historical interference data, in order to minimize user device power consumption (while e.g., still assuring that the user device discovers a redirect message within a certain time threshold). In one implementation, the historical interference data includes the number of interferences detected in a particular channel frequency band (first frequency band) within a time period.

In a further aspect, a method of operating a wireless access node connected to one or more wireless user devices is disclosed. In one embodiment, the wireless access node is connected to the one or more wireless user devices through a first frequency channel located in an unlicensed spectrum, and the wireless access node is a 3GPP NR gNB including an enhanced central unit (CUe) and/or at least one enhanced distributed unit (DUe) connected to the central unit. In one variant, the method includes: performing interference (e.g., radar) detection in the first frequency channel using the wireless access node; based on detection of interference, selecting at least one second frequency; and sending instructions to the one or more wireless user devices from the wireless access node, the instructions configured to make the one or more wireless user devices switch to the at least one second frequency. In one implementation, the at least one second frequency includes a plurality of different frequencies.

In one implementation, the foregoing interference/radar detection is performed by a DUe of the gNB and the second frequency selection is performed by the CUe. In another variant, the interference/radar detection and the second frequency selection is performed by a DUe of the gNB. In yet another variant, the interference/radar detection is performed by a first DUe connected to the CUe and the second frequency selection is performed by a second DUe connected to the CUe. In yet a further variant, the radar detection and second frequency selection is at least in part performed by the UE.

In one embodiment, the foregoing method includes sending a RAN configuration update from the gNB to the AMF (access and mobility management function) in the 5G Core (5GC), including information related to an interference detection event (e.g., radar detection). In one implementation, the information related to the interference detection event includes the first frequency and the second frequency.

In another embodiment, the wireless access node is configured to accept one or more paging requests from an AMF, including a list of idle and/or inactive user devices currently using the first frequency.

In yet another embodiment, the wireless access node is configured to send a paging message (provided by an AMF) to user devices (e.g., the idle/inactive user devices using the first frequency), and instruct the user devices to switch to the second frequency.

In yet a further embodiment, the method includes using the wireless node to identify the idle and/or inactive user devices connected to the wireless access node through the first frequency; and sending instructions to the wireless user devices to switch to the second frequency. In one implementation, the sending the instructions includes sending a redirect message, e.g., an RRC (radio resource control) redirect message, from the wireless access node to the idle/inactive wireless user devices.

In an additional aspect of the disclosure, a method of operating a wireless access network including a wireless access node and one or more wireless user devices connected to the wireless access node through a frequency channel in an unlicensed spectrum is disclosed.

In a further aspect, a wireless user device connected to a wireless network through a wireless access node and adapted for performing channel frequency change in response to interference detection is disclosed. In one embodiment, the user device includes a 3GPP UE compliant with Rel-15 and/or Rel-16. In one variant, the wireless user device, while in idle and/or inactive mode, is configured to detect a paging message from a wireless access node while the wireless user device is in idle or inactive mode (e.g., an NR-U UE operating in RRC_IDLE or RRC_INACTIVE states) and, in response to the paging message, to establish an active connection (e.g., switch to RRC_CONNECTED) with the wireless access node using a first frequency. The wireless user device is further configured to, after establishing the active connection, detect a frequency change request (e.g., RRC Release) from the wireless access node and switch from the first frequency to a second frequency, based on the frequency change request.

In another embodiment, the wireless user device, while in idle and/or inactive mode, is configured to monitor a redirect channel (physical channel similar to the paging channel) for a redirect message and, in response to a redirect message, switch from a first frequency to a second frequency, wherein the second frequency is provided in the redirect message. In one variant, the wireless user device is configured to minimize power consumption during the monitoring of the redirect channel. In one implementation, the minimization of power consumption includes monitoring the redirect channel based on historical interference data.

In yet another embodiment, the wireless user device is configured to detect interference on the first frequency. In one variant, the user device is configured to signal interference detection to its wireless access node, and change channels based on instructions from the wireless access node. In another variant, the user device is configured to select a second frequency, change to the second frequency, and signal the interference detection and the frequency change to the wireless access node.

In yet another aspect of the disclosure, a wireless network access node configured to provide network access to wireless user devices using unlicensed spectrum is presented. In one embodiment, the wireless access node is configured to detect interference and to instruct one or more of the wireless user devices to switch from a first frequency to a second frequency, based on the detection of interference. In one embodiment, the wireless access node is a Wi-Fi access point.

In another embodiment the wireless access node comprises a 5G gNB node. In one variant, the gNB includes at least one distributed logical node unit (DU) connected to a central unit (CU). In one embodiment, the unlicensed spectrum is the 5 GHz spectrum. In one embodiment, the unlicensed spectrum is 5G NR-U spectrum.

In one implementation, the node comprises a computer program operative to execute on a digital processor apparatus, and configured to, when executed: (i) perform radar detection operation, (ii) upon detection of radar in one of the frequencies on which the node currently operates, select one or more different frequencies (free from radar signals), and (iii) signal user devices to switch to the one or more different frequencies. In one variant, the computer program is configured to provide radar detection and frequency information to a 5G AMF (Access Management Function).

In another aspect, an enhanced 5G NR network entity is disclosed. In one embodiment, the network entity comprises an AMF.

In yet a further aspect, a computer readable apparatus is disclosed. In one embodiment, the computer readable apparatus includes a digital processor apparatus, a network interface, and computer readable storage medium configured to store one or more computer programs. In one variant, the one or more computer programs is configured to, when executed: enable a wireless access node perform interference (e.g., radar) detection, find interference in a first frequency, select a second frequency without interference, and initiate an operation configured to switch one or more user devices from the first frequency to the second frequency.

In another aspect, a computer readable apparatus for use on a wireless user device is disclosed. In one embodiment, the computer readable apparatus includes a digital processor apparatus, a network interface, and computer readable storage medium configured to store one or more computer programs. In one variant, the one or more computer programs is configured to, when executed: enable the wireless user device to, while in idle or inactive mode, detect a frequency redirect message from a wireless access node, and switch from a first frequency to a second frequency in response to the frequency redirect message. In another variant, the one or more computer programs is configured to, when executed: enable the wireless user device to, while in idle or inactive mode, detect a paging message from a wireless access node, switch to an active connection mode in response to the paging message, detect a frequency redirect message (while in the active connection mode), and switch from a first frequency to a second frequency in response to the frequency redirect message.

In another aspect, a network architecture for providing wireless network access to one or more computerized user devices through a network access node through unlicensed spectrum is disclosed.

In still a further aspect, a method for managing radar operation in a wireless network is disclosed. In one embodiment, the wireless network includes access points and user equipment devices operating in an unlicensed spectrum. In one implementation, the wireless network includes gNBs controlling UEs and operating in the 5G NR-U spectrum, and the method includes: detecting a radar signal in a first frequency, wherein the first frequency is currently being used by the wireless network; selecting one or more second frequencies free of radar operations; and switching/redirecting one or more UEs to operate on at least one of the second frequencies.

In one variant, a network access point (e.g., a gNB) detects the radar signal, selects the second frequencies, and initiates the switch to the second frequencies for the UEs. In another variant, an access point (gNB) detects the radar signal, selects the second frequencies, and contacts a core network function (e.g., AMF), such that the core network function initiates the switch to the second frequencies for the UEs. In one embodiment, at least some of the UEs are in idle or inactive status, and the method includes transitioning the UEs into connected status.

In a further aspect, a network software architecture is disclosed. In one embodiment, the architecture includes software elements or logic disposed on: (i) a 5G network AMF; (ii) at least one gNB, and (iii) at least one UE. In another embodiment, the architecture includes software elements or logic disposed on: (i) at least one gNB, and (ii) at least one UE.

In another aspect, an improved system information configuration for use with interference detection is disclosed. In one embodiment, the system information broadcast by a gNB is enhanced for the purposes of Dynamic Frequency Selection (DFS). For example, in one implementation, System Information Block 1 (SIB1) in 3GPP Rel-16 NR, which currently conveys uac-BarringInfo that contains cell access control parameters for different UE access categories, is enhanced with frequency redirection information such that IDLE/INACTIVE/CONNECTED UEs can obtain this information from reading SI, where the SI update is indicated via paging.

These and other aspects shall become apparent when considered in light of the disclosure provided herein.

BRIEF DESCRIPTION OF THE DRAWINGS

FIGS. 2-9 © Copyright 2019 Charter Communications Operating, LLC. All rights reserved.

DETAILED DESCRIPTION

Figure 1A:
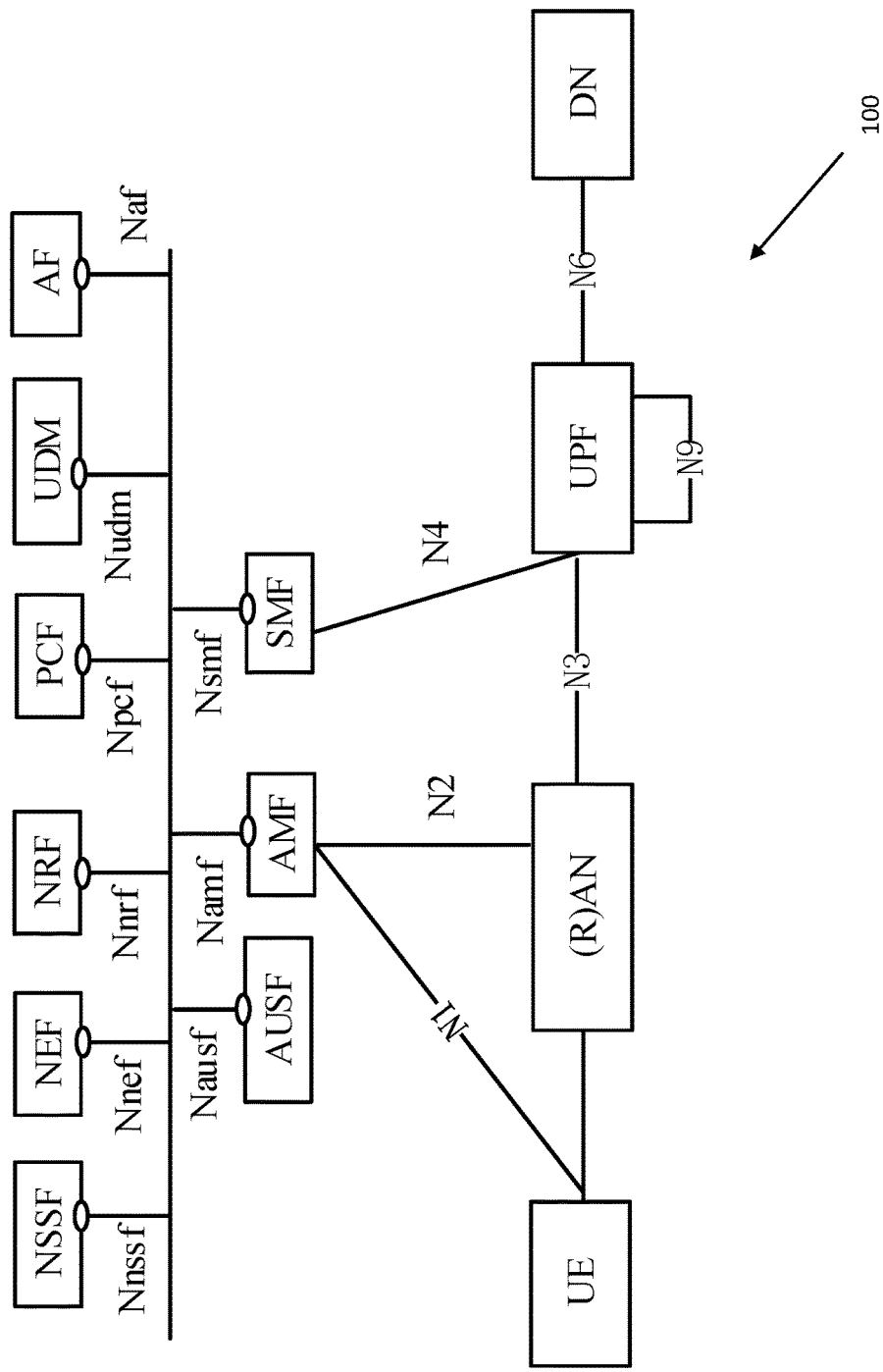
FIG. 1A is a functional block diagram of a prior art 5G system architecture and the various components thereof.
Figure 1B:
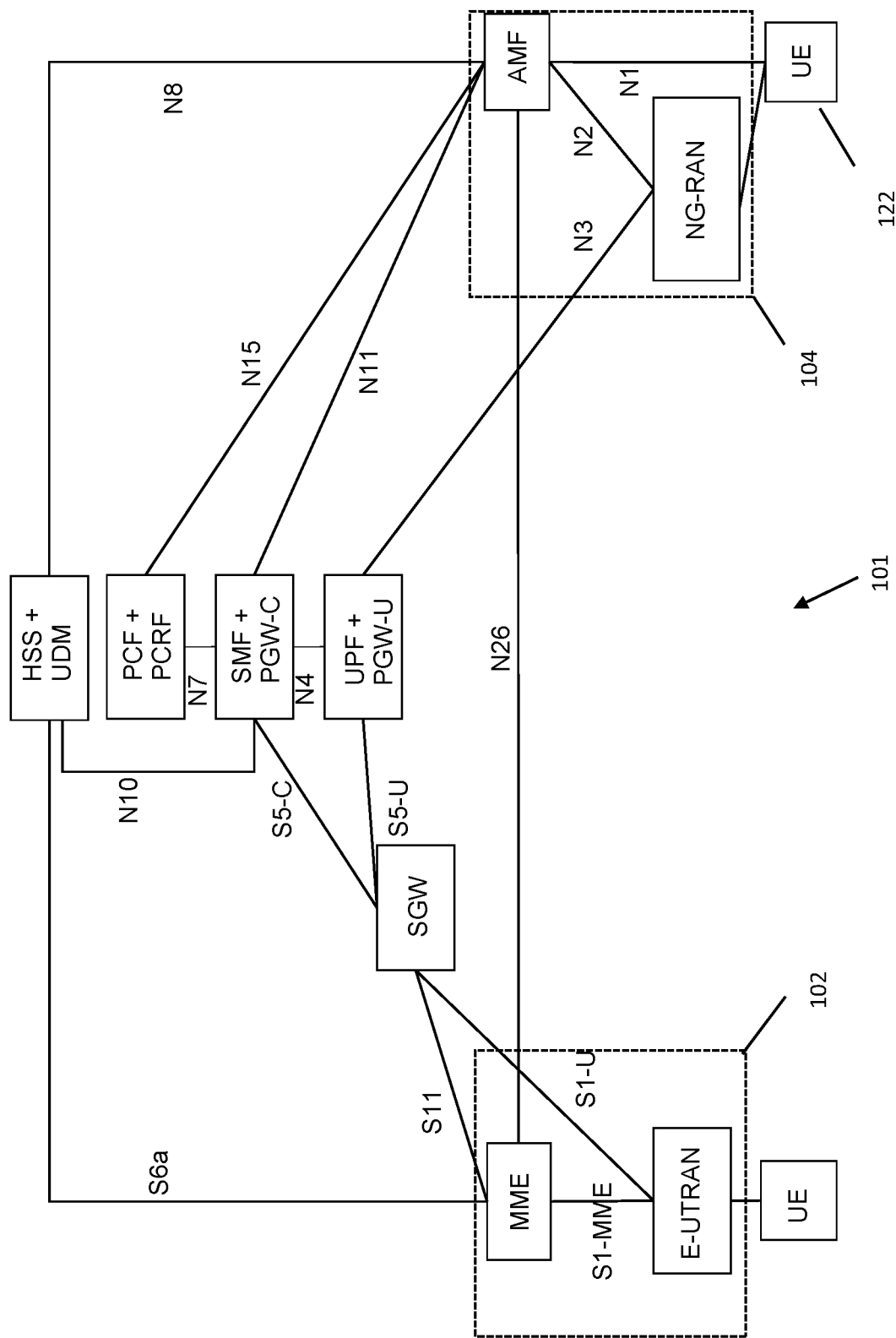
FIG. 1B is a block diagram showing the extant architecture for interworking between 5GS and EPC/E-UTRAN as defined in 3GPP TS 23.501 (FIG. 4.3.1-1 thereof).
Figure 1C:
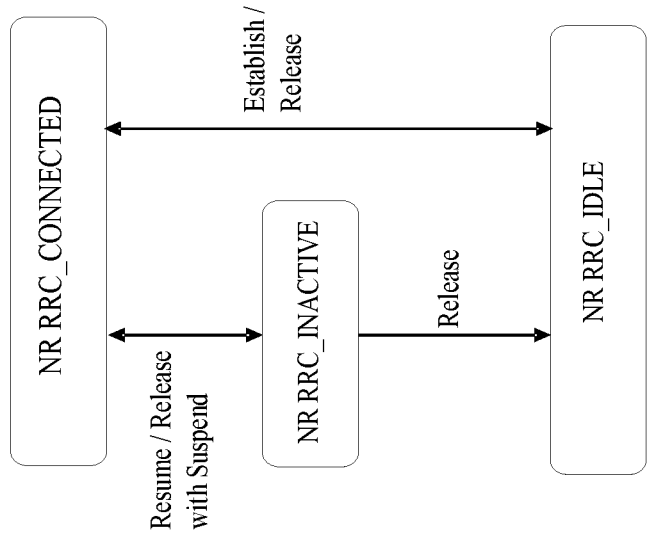
FIG. 1C is a graphical representation of prior art 5G NR UE RRC states.

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a down-loadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), GPUs, reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15 (Rel-15), and any modifications, subsequent Releases (including e.g., Rel-16 and Rel-17), or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved methods and apparatus for operating wireless devices using unlicensed frequency ranges with minimal transmission interruptions. In particular, the present disclosure provides inter alia, mechanisms for handling idle or inactive wireless devices during and subsequent to radar signal detection.

In the exemplary context of a 5G NR-U network, User Equipment devices (UEs) in the RRC_IDLE mode are also in the EMM_IDLE mode at the NAS (non-access stratum) functional layer. In this mode, neither a NAS connection nor an RRC connection exists for such UEs. Such UEs can be transitioned to the EMM_CONNECTED state via a NAS-level paging operation. Such a page can be initiated by the AMF. However, the AMF is a Core Network element which has no radio transmit/receive equipment, and further does not perform radar detection.

Hence, in one embodiment, the present disclosure provides methods and apparatus for allowing such UE(s) using NR-U spectrum (an in either RRC_IDLE or RRC_INACTIVE state) to continue to operate after radar detection by successfully switching the UE(s) to one or more different (radar-free or unencumbered) frequencies. In one variant, a gNB controlling the UE(s) informs the AMF to initiate a paging operation towards the UE(s) to move the UE(s) to a frequency without radar operations, based on the gNB or its proxy detecting or becoming aware of incipient radar operations.

In another variant, a gNB moves its UE(s) to a different frequency without relying on the AMF (i.e., it locally detects and initiates "paging" of the affected UE(s) in order to invoke the move.

In other variants, enhancements are provided to enable notification and movement of even RRC_CONNECTED UEs (e.g. via modification of a SIB to re-direct connected mode UEs), whether in addition to the aforementioned inactive/idle state functionality.

In yet other variants, one or more UE are relied upon for at least a portion of the radar operation detection; data relating to the detection is passed from the detecting UE(s) to the gNB, which then invokes either the network-based (i.e., AMF involved) or local (non-AMF involved) procedures discussed above. In one approach, portions of radar operation detection performed by a UE may be part of a co-located technology within the device wherein the UE resides; e.g. a Wi-Fi device (e.g. Wi-Fi Access Point or Wi-Fi STA).

Furthermore, embodiments are presented to permit gNBs to indicate frequency changes to other gNBs that may be relying on transmissions from the first gNB for various purposes, such as integrated access and backhaul (IAB) or RAN-based synchronization. In one variant, the other gNBs are signaled directly from the affected gNB. In another variant, the other gNBs are signaled indirectly, such as via the AMF or other proxy entities of the affected gNB.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO and/or MNO networks), other types of radio access technologies ("RATs") and/or other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

For example, in one alternative application, the methods and apparatus disclosed herein are used in conjunction with a 4G core used with unlicensed 5G (e.g., 5 GHz-band) infrastructure and spectrum, such as in a MulteFire network.

In another alternative application, the methods and apparatus disclosed herein are used in conjunction with 3GPP infrastructure used with CBRS spectrum (e.g., for incumbent detection such as military radar or communications before a SAS or other entity notifies of a GAA/PAL spectrum withdrawal). See e.g., co-owned and co-pending U.S. patent application Ser. No. 16/791,352 filed Feb. 14, 2020 and entitled "APPARATUS AND METHODS FOR GENERATING AND DISTRIBUTING POLICY IN WIRELESS NETWORKS", which is incorporated herein by reference in its entirety, for exemplary infrastructure and policy regarding quasi-licensed and unlicensed spectrum allocation which may be used consistent with the present disclosure.

Other features and advantages of the present disclosure will immediately be recognized by persons of ordinary skill in the art with reference to the attached drawings and detailed description of exemplary embodiments as given below.

Access Node-Assisted CN-Paging Enhancements and Methods

Referring now to FIGS. 2 and 2A-2D, exemplary embodiments of methods of using one or more access nodes (e.g., gNBs) and a network entity (e.g., 5G AMF) to manage interference (e.g., radar) found in a frequency channel being used by at least one idle or inactive user or client device (e.g., UE) registered with the access nodes are described.

Figure 2:
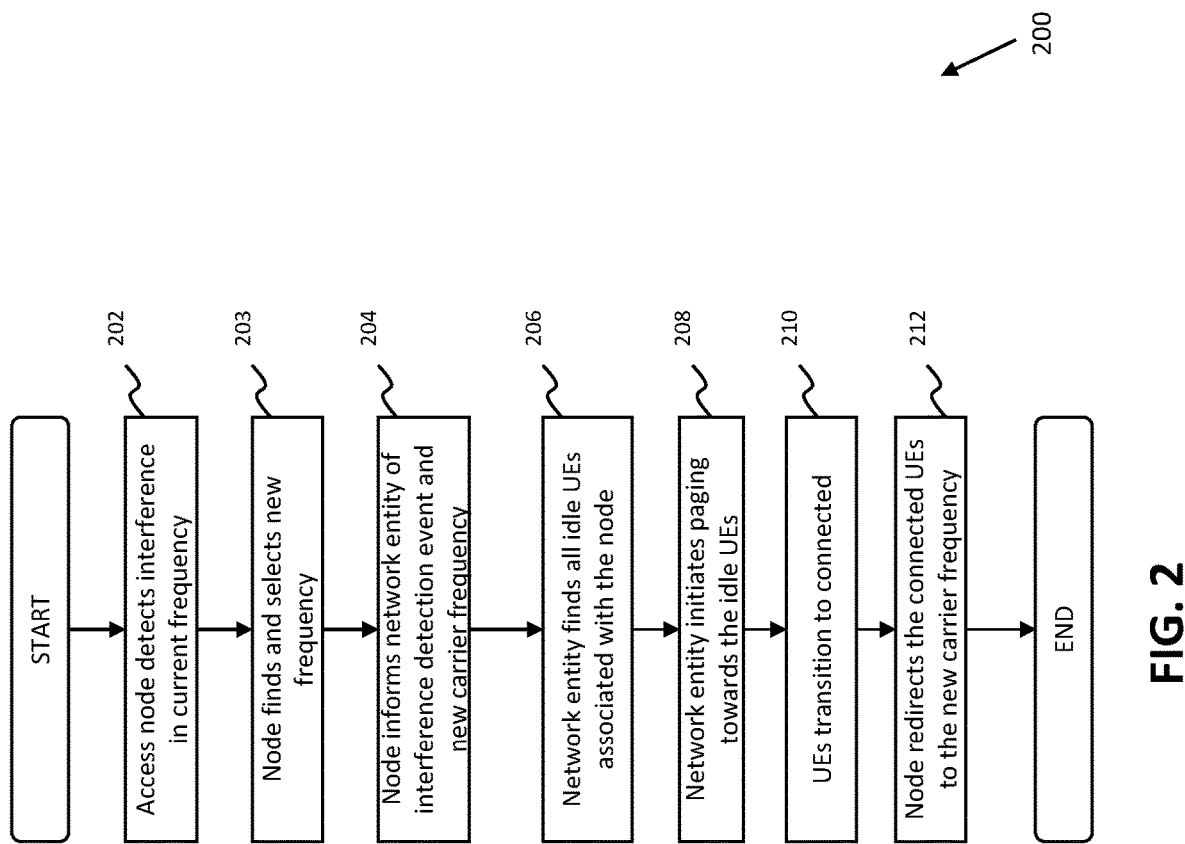
FIG. 2 is a flow chart of one embodiment of a method of performing interference detection by a 5G NR access node, according to the present disclosure.

As shown in FIG. 2, one embodiment of the generalized method 200 includes first detecting interference or a prospective interferer per step 202. As used herein, the term "detect" may be active or passive; i.e., it may be an actual detection of electromagnetic emissions from e.g., weather radar, or it may be data or messaging indicating that the interferer is present/operational or about to become so. In one variant, the access node (gNB or a proxy detection device thereof) performs the detection.

Per step 203, the access node (e.g., gNB or a proxy node thereof) selects a new frequency band or group of frequencies (e.g., carriers or bands of carriers) which are putatively free of interference. This may again be active or passive in nature; i.e., via actual monitoring of the carrier(s), or via data/massaging indicating that there are no interferers currently operational or planned for at least a prescribed period of time.

Per step 204, the gNB or its proxy informs the network entity (e.g., AMF) of the "detection" event and the selected new carrier(s).

Per step 206, the network entity (e.g., AMF) locates or identifies all idle or inactive user or client devices (UEs) associated with the reporting gNB(s).

Per step 208, the AMF initiates paging toward the affected/identified UEs to alert them to the incipient channel change.

Per step 210, in response to the paging, the identified UEs each transition to an active/connected (RRC_CONNECTED) state, and per step 212, the UEs are all redirected by the cognizant gNB of the redirection to the new carrier(s).

Figure 2A:
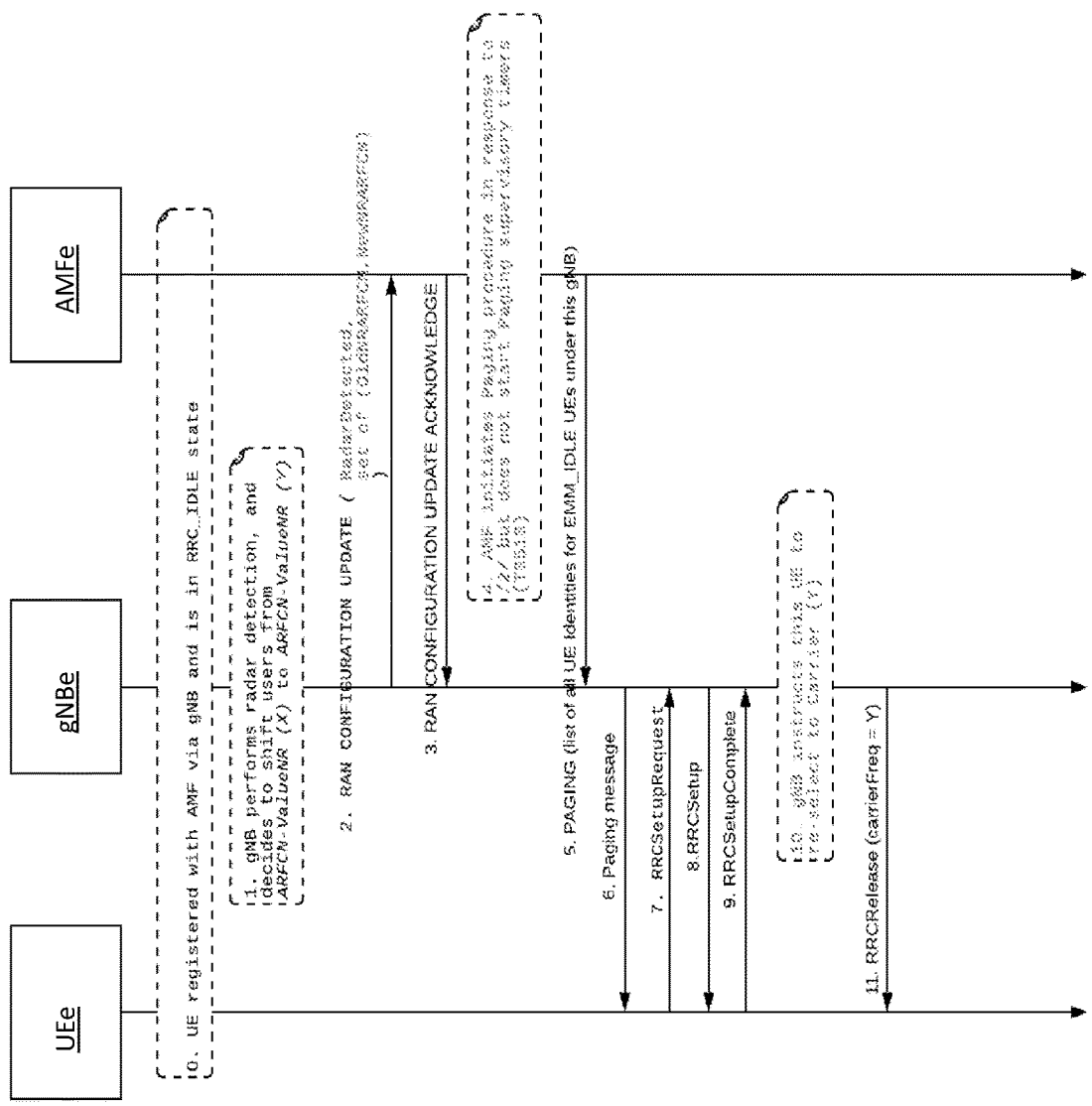
FIG. 2A is a ladder/call flow diagram illustrating one exemplary example of performing interference detection which may be implemented in FIG. 2.

FIG. 2A illustrates an exemplary call flow/ladder diagram of a method of detecting interference (e.g., radar) and transitioning e.g., idle UEs from a first frequency to a second frequency, based on the detection. In the call flow Operation 0, the UE registers with the network (AMF) via a gNB following normal 5G Registration procedures (per 3GPP TS 23.501 and TS 23.502). Upon completion of registration, at some point the UE transitions to RRC_IDLE and EMM_IDLE (per 3GPP TS 38.300 and TS 38.311).

In call flow Operation 1, the gNB, assumed to be operating in a first frequency (i.e., frequency "X"), detects incumbent radar operations. Upon such detection, the gNB picks a frequency where no radar operations are present e.g., frequency "Y." The gNB starts broadcasting NR service parameters on frequency Y with the same Physical Cell ID (PCI) as that of frequency X. This process corresponds to steps 202-203 of FIG. 2, wherein the gNB detects interference (e.g., radar) in a current frequency being used by at least one of its UEs and selects one or more new frequencies for the UEs to switch to.

As shown in Operation 2 of FIG. 2A, the gNB initiates a N2-AP RAN CONFIGURATION UPDATE message by setting RadarDetected to true, and for each affected frequency CurrentOperatingFreq (X), it includes the corresponding new frequency to which redirection of UEs is to occur NewOperatingFreq (Y) in AffectedCarriers. Note that the RAN CONFIGURATION UPDATE message is sent by the NG-RAN node to transfer updated application layer information for an NG-C interface instance (with direction: NG-RAN node AMF). This operation corresponds to step 204 in FIG. 2, where the gNB informs the AMF function within the 5G Core of the interference detection event, along with the new frequency (Y) it wants to use (e.g., move UEs to).

In transmission (Operation 3) of FIG. 2A, the AMF acknowledges successful receipt of the RAN CONFIGURATION UPDATE with a RAN CONFIGURATION UPDATE ACKNOWLEDGE message per 3GPP TS 38.413.

In Operation 4 of FIG. 2A, when the AMF receives RadarDetected=True from a gNB, it looks up all EMM_IDLE UEs in its context. For those UEs associated with this gNB, the AMF initiates CN-paging, but does not start the paging supervisory timer (T3513). In call flow Operation 5, the AMF sends an N2-AP PAGING message to the gNB with the identity of the UE to be paged. In call flow Operations 6-9, normal paging behavior per 3GPP TS 38.300 and TS 38.311 applies.

The AMF looks up the context of all EMM_IDLE UEs associated with that gNB, and initiates paging towards those UE. In one variant, a normal paging procedure follows. In one implementation, this may be implemented in Operations 6-9 of FIG. 2A.

The paged UEs transitions to RRC_CONNECTED status, and in Operation 10 of FIG. 2A, the gNB redirects those UEs to the new carrier frequency (Y). In call flow transmission (Operation 11), the gNB sends RRCRelease with carrierFreq in redirectCarrierInfo to Y to the affected UE(s).

The following Tables 2-5 illustrate various exemplary 3GPP-based IEs (information elements) and associated protocols useful with the methods and apparatus described in the present disclosure.

TABLE 2

| IE/Group Name | Presence | Range | IE type and reference | Semantics description | Criticality | Assigned Criticality |
|---|---|---|---|---|---|---|
| Message Type | M | | 9.3.1.1 | | YES | reject |
| RAN Node Name | O | | PrintableString (SIZE(1 . . . 150, . . . )) | | YES | ignore |
| Supported TA List | | 0 . . . 1 | | Supported TAs in the NG-RAN node. | YES | reject |
| >Supported TA Item | | 1 . . . <maxnoofTACs> | | | — | |
| >>TAC | M | | 9.3.3.10 | Broadcast TAC | — | |
| >>Broadcast PLMN List | | 1 | | | — | |
| >>>Broadcast PLMN Item | | 1 . . . <maxnoofBPLMNs> | | | — | |
| >>>>PLMN Identity | M | | 9.3.3.5 | Broadcast PLMN | — | |
| >>>>TAI Slice Support List | M | | Slice Support List 9.3.1.17 | Supported S-NSSAIs per TA. | — | |
| Default Paging DRX | O | | Paging DRX 9.3.1.90 | | YES | ignore |

TABLE 2-continued

| IE/Group Name | Presence | Range | IE type and reference | Semantics description | Criticality | Assigned Criticality |
|---|---|---|---|---|---|---|
| Global RAN Node ID | O | | 9.3.1.5 | | YES | ignore |
| RadarDetected | O | | 9.3.1.X | Whether gNB detected radar activity on a certain frequency | YES | ignore |
| Affected Carriers List | O | 1 | | | YES | ignore |
| >AffectedCarriers List item | | 0 ... <maxnoofFreqPairs> | | | — | |
| >>CurrentOperatingFreq | M | | NR ARFCN 9.3.1.Y | Current operating freq (NR ARFCN) | — | |
| >>NewOperatingFreq | M | | NR ARFCN 9.3.1.Y | Freq (NR ARFCN) to which UEs need to be redirected | — | |

TABLE 3

| Range bound | Explanation |
|---|---|
| maxnoofTACs | Maximum no. of TACs. Value is 256. |
| maxnoofBPLMNs | Maximum no. of Broadcast PLMNs. Value is 12. |
| maxnoofFreqPairs | Maximum no. of Frequency (NR ARFCN) Pairs affected by radar detection. Value is 32. |

The RadarDetected IE (Table 4 below) indicates that the gNB has detected radar activity on its current operating frequency.

TABLE 4

| IE/Group Name | Presence | Range | IE type and reference | Semantics description |
|---|---|---|---|---|
| RadarDetected | M | | ENUMERATED (true, ... ) | |

The NR ARFCN IE (Table 5 below) generally corresponds to maxNARFCN from TS 38.331.

TABLE 5

| IE/Group Name | Presence | Range | IE type and reference | Semantics description |
|---|---|---|---|---|
| NR ARFCN | M | | INTEGER (0 ... 3279165) | |

Paging for 5GS Services

Figure 2B:
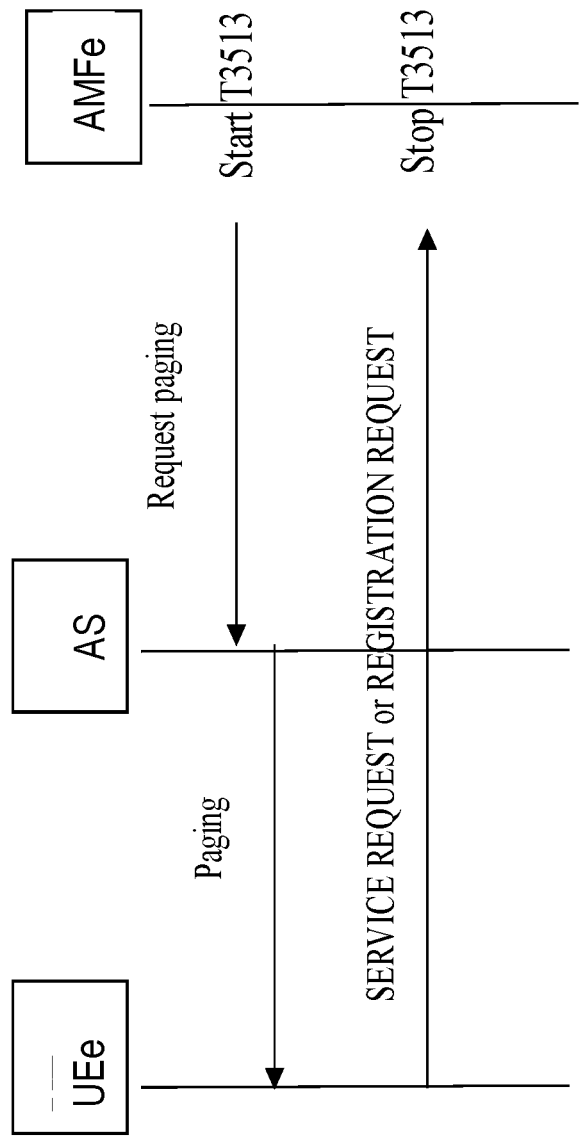
FIG. 2B is a simplified call flow diagram of a paging procedure for 5GS services.

In one exemplary embodiment of the present disclosure, the network (e.g., the AMF in the exemplary 5G context) initiates a paging procedure for 5GS services when NAS signalling messages or user data is pending/waiting to be sent to the UE in 5GMM-IDLE mode over 3GPP access (see the example shown in FIG. 2B).

To initiate the procedure, the 5GMM (5G Mobility Management) entity in the AMF requests the lower layer to start paging, and starts a timer (T3513). If the procedure is initiated due to receiving a RAN configuration update from a gNB indicating that radar activity was detected, then the AMF requests the lower layer to start paging, but not start the timer T3513.

If downlink signalling or user data is pending to be sent over non-3GPP access, the 5GMM entity in the AMF indicates to the lower layer that the paging is associated to non-3GPP access.

Upon reception of a paging indication, the UE stops the timer (T3346), if the timer is currently running, and initiates: (i) a service request procedure over the 3GPP access to respond to the paging as specified in subclauses 5.6.1; or (ii) a registration procedure for mobility and periodic registration update over the 3GPP access to respond to the paging as specified in subclauses 5.5.1.3.

The network (e.g., AMF) stops its timer T3513 for the paging procedure when an integrity-protected response is received from the UE and is successfully integrity checked by the network. If the response received is not integrity protected, or the integrity check is unsuccessful, the AMF timer T3513 for the paging procedure is kept running. Upon expiry of the timer T3513, the network may reinitiate paging.

If the network, while waiting for a response to the paging sent without paging priority, receives downlink signalling or downlink data associated with priority user-plane resources for one or more Protocol Data Unit (PDU) sessions, the network stops the timer T3513, and then initiates the paging procedure with paging priority.

Figure 2C:
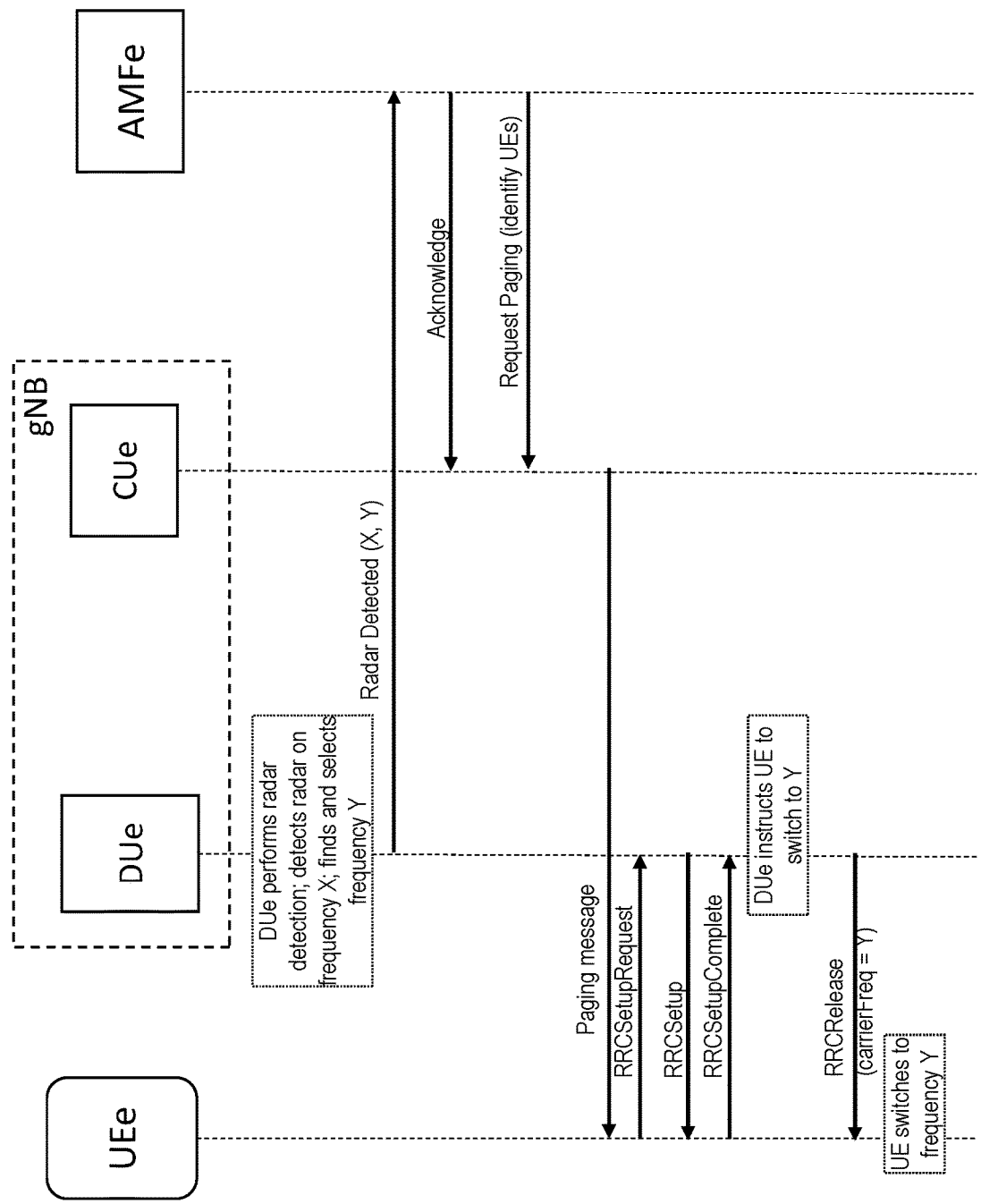
FIG. 2C is a ladder diagram illustrating one approach for performing of interference detection, in accordance with aspects of the present disclosure.

FIG. 2C is a ladder diagram illustrating one approach for performing of interference detection (utilizing the AMF, but with an enhanced DU (DUe), as discussed below, performing all the requisite management logic), in accordance with one embodiment of the present disclosure. In one aspect of the disclosure, the method 200 of FIG. 2 may be implemented as shown in the ladder diagram of FIG. 2C. In a gNB architecture that includes e.g., an enhanced CU (CUe) and at least one DUe connected to the CUe, as will be later described with respect to FIG. 4B, one of the DUe's may locally perform all the interference detection and frequency selection of the method 200.

In one embodiment, during steps 202-203 of the method 200, a local DUe (or its proxy) performs radar detection, detects radar operation at a first frequency X and, upon such detection, selects another frequency that does not have radar interference (second frequency Y). In one variant, the first frequency is located in an unlicensed spectrum, and selecting the second frequency includes identifying a plurality of alternate frequencies in real time (e.g., other frequencies within the unlicensed spectrum) and identifying/selecting an unoccupied frequency from the plurality of alternate frequencies. In another variant, selecting the second frequency includes obtaining a predetermined list of alternate frequencies and identifying/selecting an unoccupied frequency from the predetermined list of alternate frequencies.

In one embodiment, as shown in FIG. 2C, the DUe initiates the radar detection operation (e.g., periodically, or according to another criterion such as being triggered by an event). In another embodiment, as shown below with respect to FIG. 2D, the DUe may perform the radar detection operation in response to a signal/instruction from its CUe. The radar detection and second frequency selection may be performed for instance using local detection management logic (DML) of the DUe. The DUe communicates a radar detected message (including an indication of both frequencies X and Y) to its CUe, e.g., as a RAN CONFIGURATION UPDATE. In step 204, the CUe transmits the radar detected message onto the AMFe function within the 5G network.

The AMFe transmits an acknowledgement of the radar detected message to the CUe and in one variant of step 206, identifies all the currently idle/inactive UEs being serviced by the DUe using frequency X.

In step 208 of the method 200 (as implemented in the exemplary embodiment of FIG. 2C), the AMFe transmits a paging request (with the identified user device) to the CUe in order to transition the identified user devices to an active/connected state. As shown in FIG. 2C, after the CUe transmits the initial paging message to the UEs via the DUe, steps 210-212 are performed by the DUe. In one embodiment, after the initial paging request, the DUe independently handles the transition of the UEs from idle to connected and, once the transition is complete, instructs the UEs to switch from frequency X to frequency Y.

Figure 2D:
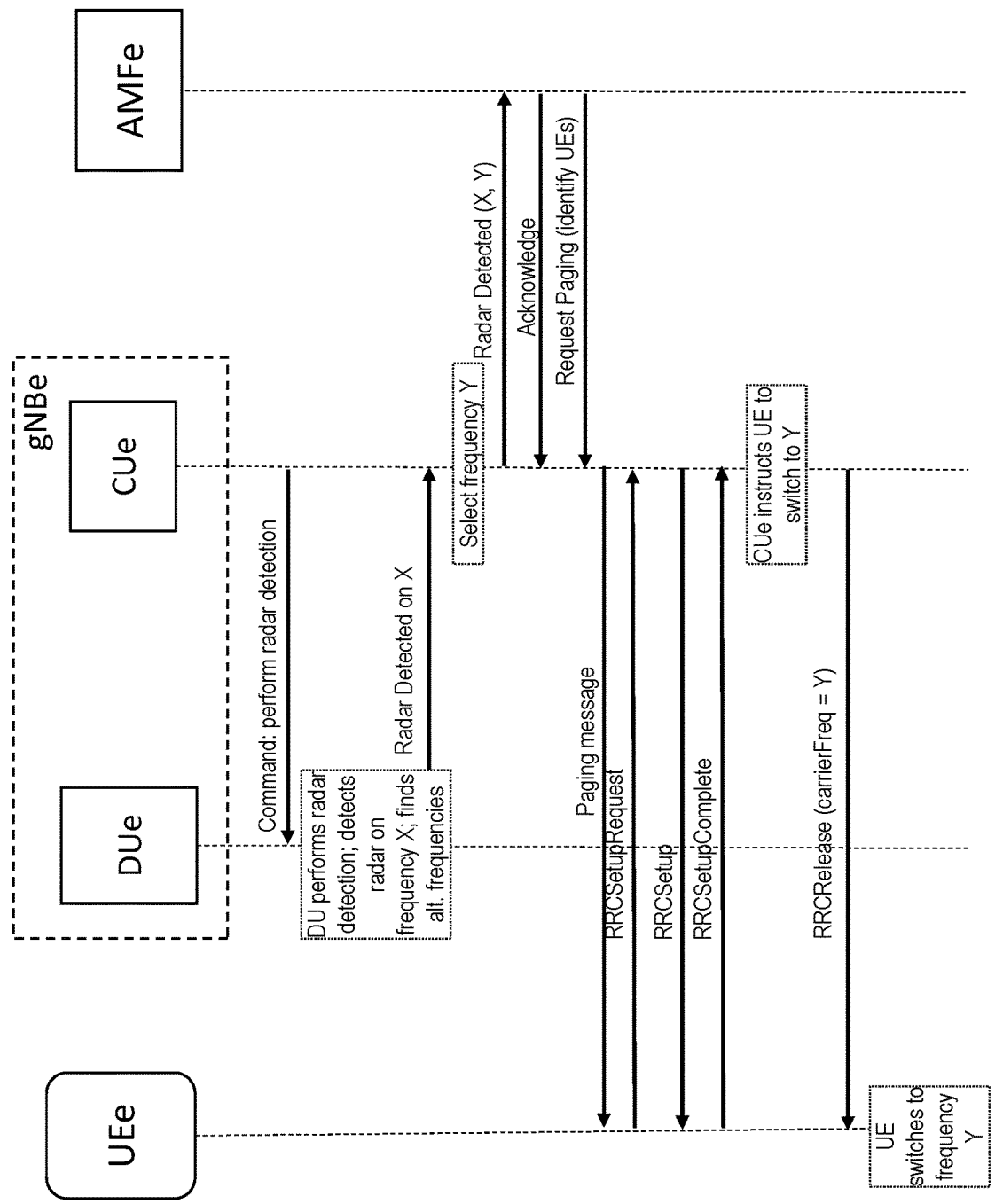
FIG. 2D is a ladder diagram illustrating another approach for performance of interference detection, in accordance with aspects of the present disclosure.

FIG. 2D is a ladder diagram illustrating another approach for performing of interference detection (utilizing the AMF, but with an enhanced CU (CUe) and an enhanced DU (DUe), as discussed below, performing all the requisite management logic), in accordance with another embodiment of the present disclosure. In the embodiment of FIG. 2D, different portions of the requisite interference detection management logic of a gNB may be handled by different portions of the gNB (the CUe and the DUe's). For example, the CUe initiates an interference detection operation by sending an instruction to the DUe to perform interference detection. Similar to the embodiment of FIG. 2C, the DUe performs radar detection and, in response to a detection of radar operation on frequency X, identifies one or more alternate frequencies. In one embodiment, the DUe may identify frequencies within the unlicensed spectrum that are free of interference, and transmit a list of the identified frequencies to its CUe (along with a radar detected message). As shown in FIG. 2D, the CUe may implement a part of the interference detection management logic by (i) selecting the second frequency Y from the list of identified frequencies, and (ii) transmitting a radar detection message to the AMFe (including an indication of frequencies X and Y).

In one variant, the AMFe transmits an acknowledgement signal to the CUe, identifies idle UEs being serviced by the DUe (or the broader gNB) using frequency X (step 206 in method 200), and transmits a paging request for the identified UEs (step 208). In the embodiment of FIG. 2D, in response to the paging request, the CUe uses the DUe to transition the identified UEs from idle/inactive to active/connected state and then instruct the UEs to switch from frequency X to frequency Y.

Access Node Initiated Redirect

Figure 3:
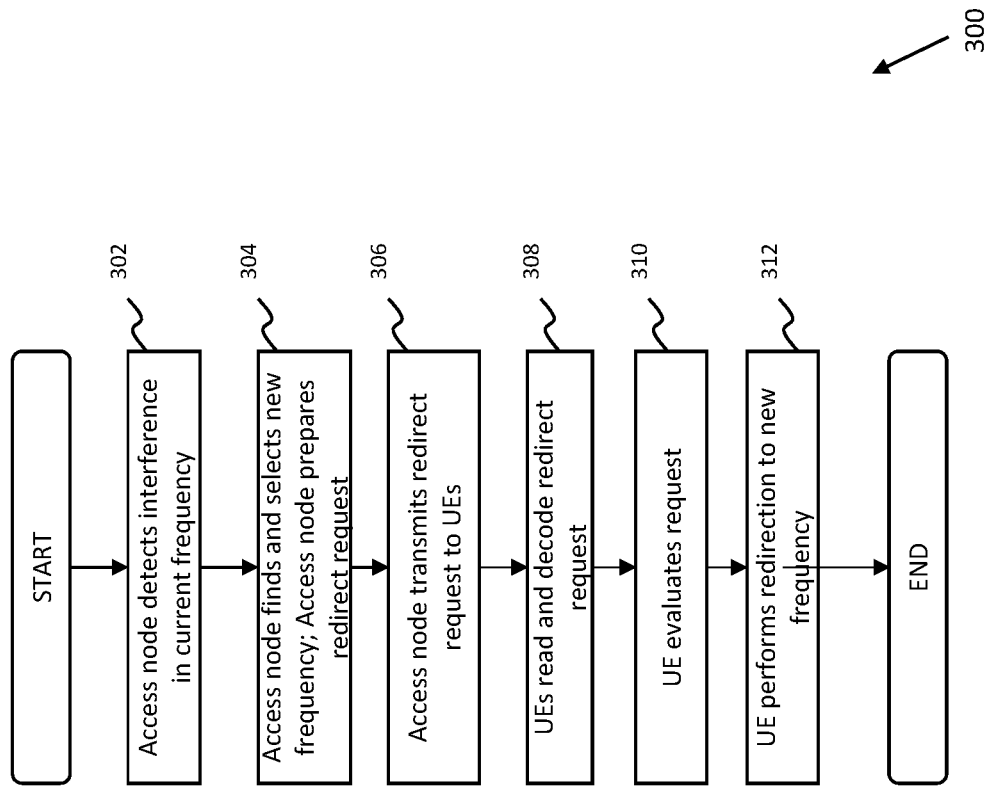
FIG. 3 is a flow chart of another embodiment of a method of performing interference detection via a wireless access node, according to the present disclosure.

Referring now to FIG. 3, one embodiment of a method 300 of using a gNB redirect one or more UEs to a different frequency, without involving a network entity such as the AMF, is shown and described.

In steps 302-304 of FIG. 3, upon detection of interference/ radar in one of the frequencies (e.g., frequency "X", such as UNII-2 and UNII-2e bands in the 5 GHz unlicensed spectrum) where the access node (e.g., the gNB) is currently operating, the gNB picks a frequency where no radar operations/interference are present (e.g., frequency "Y"), and prepares a redirect request (i.e., composes a new RRC CCCH payload RRCRedirect).

In step 306 of FIG. 3, the gNB transmits/broadcasts the redirect request to the appropriate client/user devices (UEs). In one embodiment, a gNB transmits RRCRedirect in a PDCCH common search space (CSS) (for example, Type0A or Type2 CSS) using a new DCI format scrambled with a new RNTI RD-RNTI that is predefined in the specification. The parameters of this PDCCH CSS are broadcast as part of PDCCH_ConfigCommon in system information. The contents of the RRCRedirect message are similar to those specified in the above embodiments, i.e., includes the corresponding new frequency ("Y") to which redirection of UEs is to occur.

In step 308, idle user/client devices (RRC_IDLE UEs when not in idle mode DRX) read and decode the redirect request, e.g., read the DCI (downlink control information) and unscramble RD-RNTI to decode RRCRedirect message.

In steps 310-312, for each value of CurrentOperatingFreq pair in the redirect (RRCRedirect) message, the UE compares it against the camped cell's ARFCN (absolute radio frequency channel number), and in step 312, if a match is found, the UE performs cell reselection to frequency indicated in RedirectedOperatingFreq per TS 38.304.

Figure 3A:
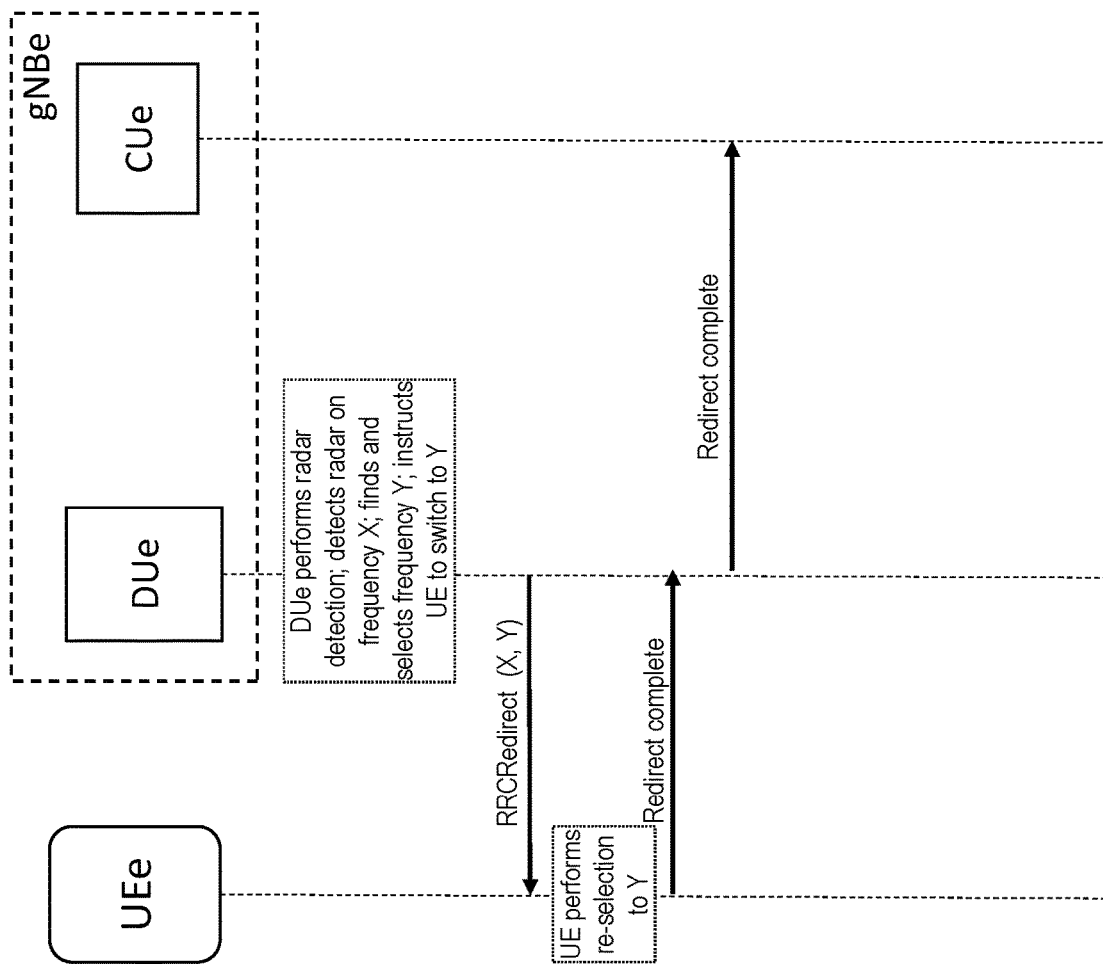
FIG. 3A is a ladder diagram illustrating one approach for management of interference detection in a 5G NR network, in accordance with aspects of the present disclosure.

FIG. 3A is a ladder diagram illustrating one approach for performing of interference detection (utilizing only an enhanced DU (DUe), as discussed below, to perform all the requisite management logic), in accordance with one embodiment of the present disclosure. In the embodiment of FIG. 3A, a DUe performs radar detection, detects radar interference at a first frequency X, selects a second frequency Y (e.g., from a current or predetermined list of alternate frequencies) that is free of radar operation, and instructs the user devices operating that frequency X to switch to frequency Y (e.g., using an RRCRedirect message). As described elsewhere in the disclosure, the user devices (UEs) in the system of FIG. 3A are able to receive the frequency redirect message even if they are in idle/ inactive modes. For example, the UEs periodically monitor a special redirect channel for the redirect message. In one embodiment, only idle/inactive UEs periodically monitor the redirect channel, and the DUe may transmit/broadcast redirect messages using both the redirect channel (in order to reach the idle UEs) and the current operating frequency X (to reach regular, active UEs).

In another embodiment, all UEs connected to the DUe (regardless of activity or other status) monitor the redirect channel and the DUe broadcasts the redirect message using only the redirect channel.

One a UE has transitioned to the new frequency Y and transmitted a "redirect complete" message to the DUe, the DUe notifies the CUe that the UE has switched from X to Y. In the embodiment of FIG. 3A, the interference detection and management is handled entirely by the DUe, and the CUe is merely kept up to date.

Figure 3B:
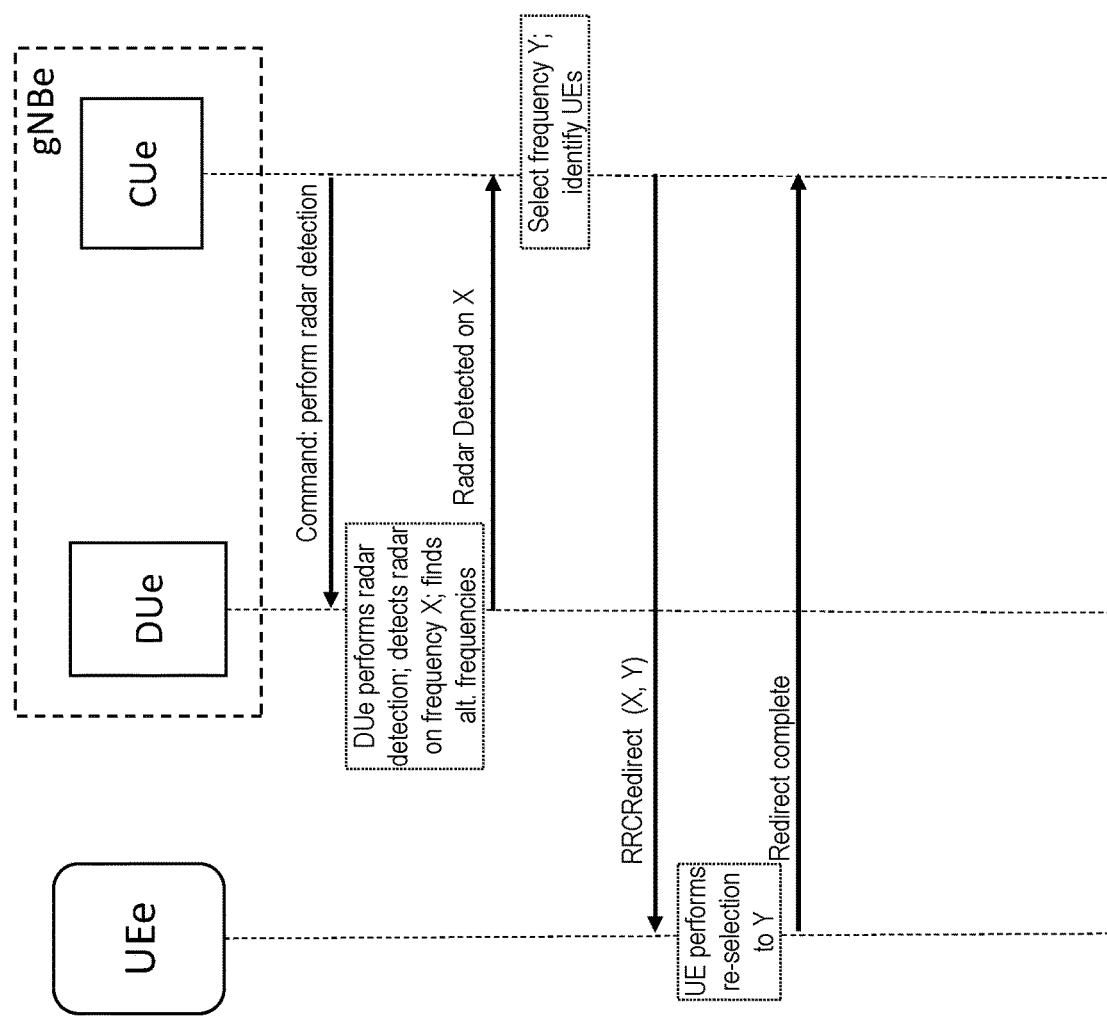
FIG. 3B is a ladder diagram illustrating another approach of interference detection in a 5G NR network, in accordance with aspects of the present disclosure.

FIG. 3B is a ladder diagram illustrating another approach for performing of interference detection (utilizing an enhanced CU (CUe) and DU (DUe), as discussed below, to perform all the requisite management logic), in accordance with another embodiment of the present disclosure. In the embodiment of FIG. 3B, the CUe instructs (e.g., periodically) the DUe to perform a radar detection operation. The DUe performs radar detection, detects radar operation on frequency X, and generates a list of alternate frequencies that may be used by the DUe. In one embodiment, the DUe notifies the CUe of the radar operation detected on frequency X and provides the list of alternate frequencies. The CUe selects the second frequency Y from the alternate frequencies and instructs the appropriate UEs (via the DUe) to switch from the first frequency X to the second frequency Y.

Figure 3C:
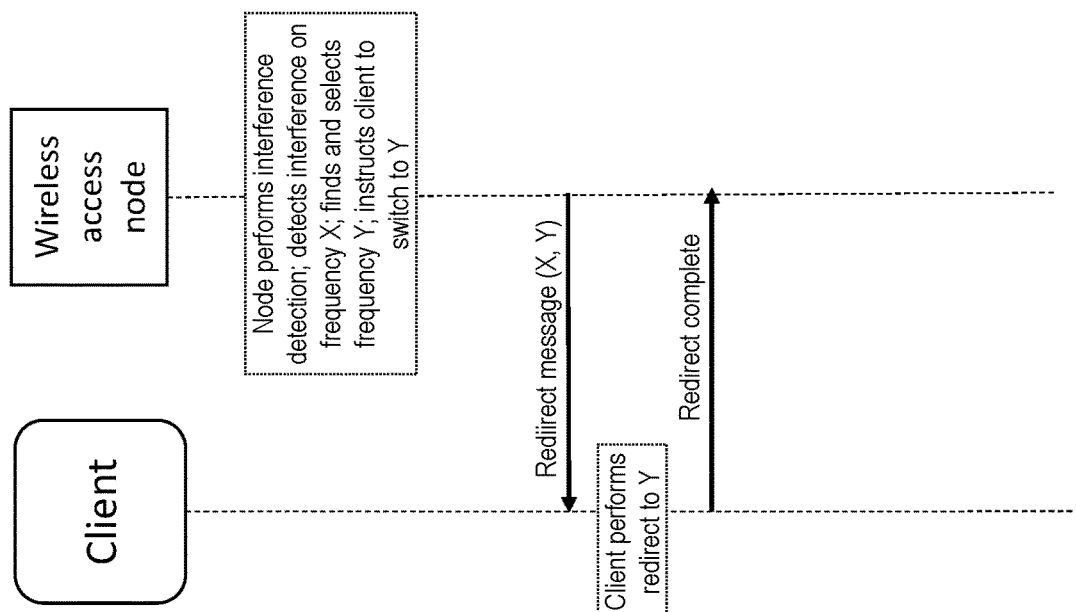
FIG. 3C is a ladder diagram illustrating handling of interference detection in a wireless network, in accordance with aspects of the present disclosure.

FIG. 3C is a ladder diagram illustrating yet another approach for performing of interference detection (utilizing an enhanced non-3GPP access node for performing all the requisite management logic), in accordance with another embodiment of the present disclosure. In one approach, the non-3GPP access node may be a Wi-Fi AP (access point) operating in the unlicensed frequency spectrum used by Wi-Fi systems. The wireless access node of FIG. 3C performs all the requisite interference detection management logic including (i) performing interference detection, (ii) detecting interference on a first frequency X, (iii) identify alternate frequencies (e.g., other frequencies within the unlicensed frequency spectrum that are free of interference), (iv) select a second frequency Y that is free of interference, and (v) instruct the client device currently using frequency X to switch to frequency Y.

Distributed gNB Architectures

Figure 4A:
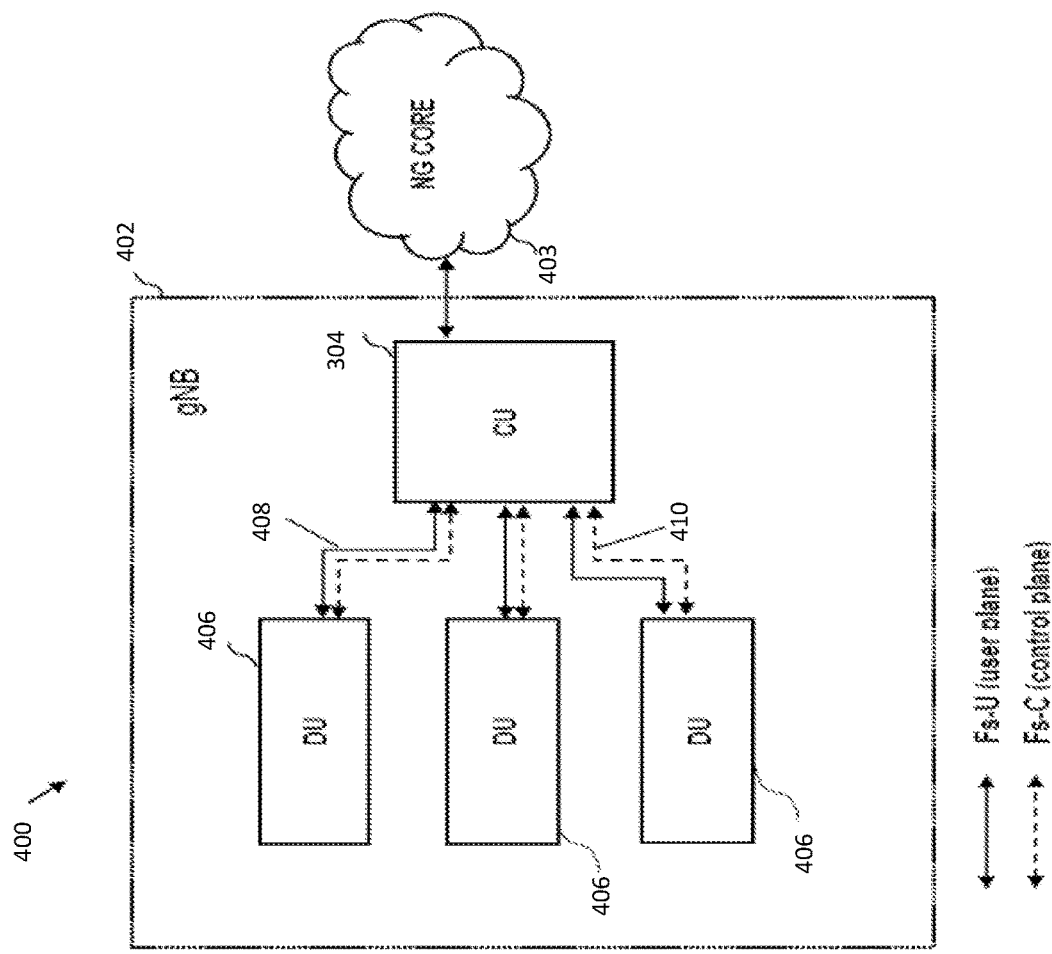
FIG. 4A is a functional block diagram of a prior art gNB architecture including a central unit (CU) and multiple distributed units (DUs).
Figure 4B:
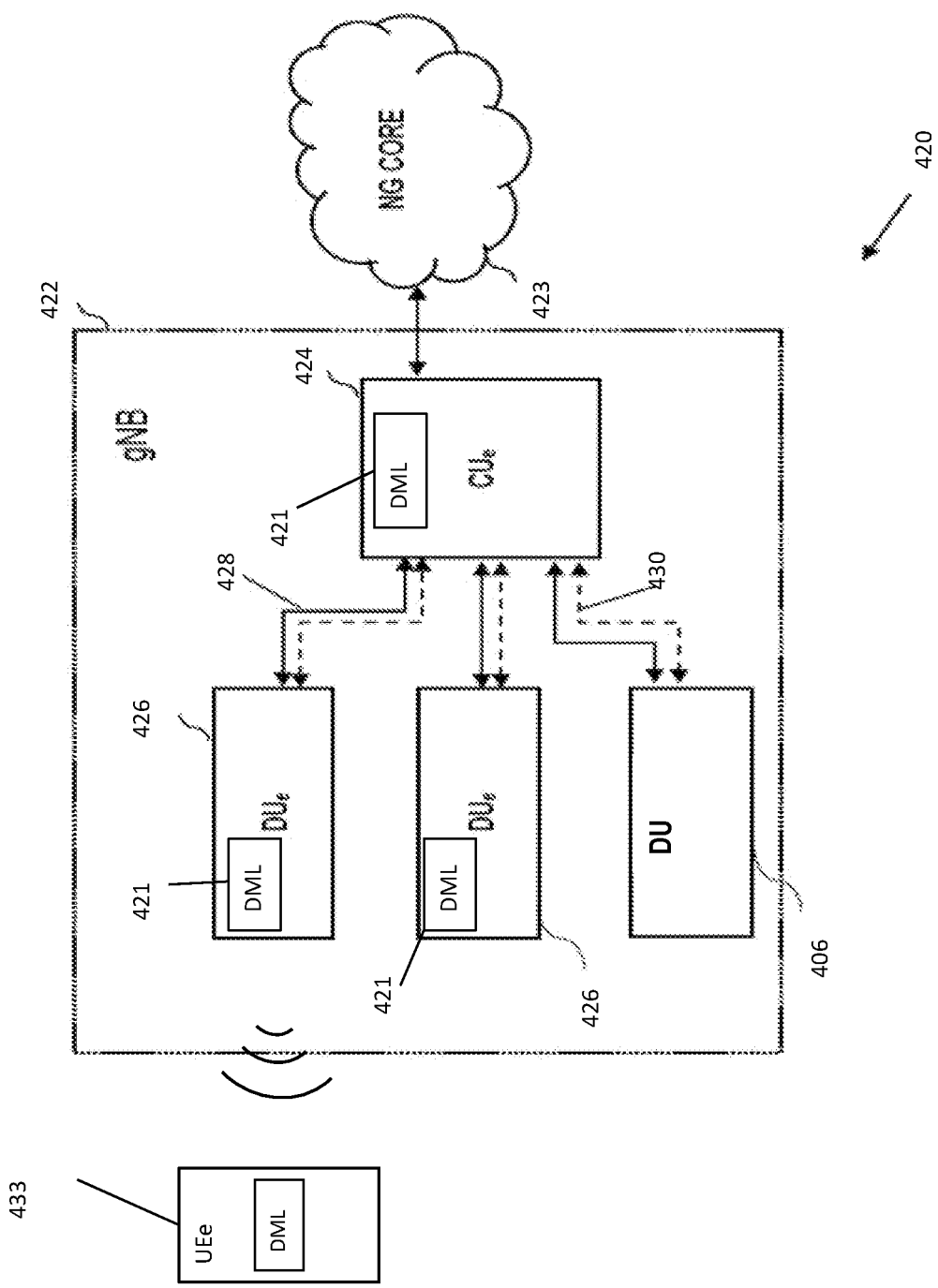
FIG. 4B is a functional block diagram of one exemplary embodiment of a gNB architecture including a CU and multiple DUs, according to the present disclosure.

Referring now to FIGS. 4A and 4B, an exemplary embodiment of the distributed (CU/DU) gNB architecture according to the present disclosure is described.

As a brief aside, and referring to FIG. 4A, the CU 404 (also known as gNB-CU) is a logical node within the NR architecture 400 that communicates with the NG Core 403, and includes gNB functions such as transfer of user data, session management, mobility control, RAN sharing, and positioning; however, other functions are allocated exclusively to the DU(s) 406 (also known as gNB-DUs) per various "split" options described subsequently herein in greater detail. The CU 404 communicates user data and controls the operation of the DU(s) 406, via corresponding front-haul (Fs) user plane and control plane interfaces 408, 410.

Accordingly, to implement the Fs interfaces 408, 410, the (standardized) F1 interface is employed. It provides a mechanism for interconnecting a gNB-CU 404 and a gNB-DU 406 of a gNB 402 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

With the foregoing as a backdrop, a first architecture 420 configured for interference detection and management according to the present disclosure is shown in FIG. 4A. This architecture 420 includes a gNB 422 having an enhanced CU (CUe) 424 and a plurality of enhanced DUs (DUe) 426. It will be noted that some DU within a given gNB (see DU 406 as shown in FIG. 4A) may not be enhanced with the detection/management capabilities as described herein, or all may. Likewise, as referenced in some of the foregoing ladder diagrams, the detection/management functionality may be split between the DUe and CUe of a given enhanced gNB 422, such as where the radar detection is performed by the DUe, and the signaling and other protocols involved in UE frequency migration are handled by the CUe (via the DUe).

As described in greater detail subsequently herein, these enhanced entities are enabled to permit efficient inter-process signaling and interferer detection and management, whether autonomously or under control of another logical entity (such as the NG Core 423/5G RAN with which the gNB communicates including an AMF (not shown), or components thereof).

The individual DUe's 426 in FIG. 4B communicate data and messaging with the CUe 424 via interposed physical communication interfaces 428 and logical interfaces 430. As previously described, such interfaces may include a user plane and control plane, and be embodied in prescribed protocols such as F1AP. In the illustrated embodiment, one CUe 424 is associated with one or more DUe's 426, yet a given DUe is only associated with a single CUe. Likewise, the single CUe 424 may be communicative with a single NG Core 423, such as that operated by an MNO or MSO, or multiple cores. Each NG Core 423 may have multiple gNBs 402 associated therewith as well.

Also shown are individual detection management logic (DML) modules 421 for each of the "enhanced" entities (CUe/DUe). These logic modules may be heterogeneous or homogenous in nature, and may overlap in functionality if desired (e.g., each may perform a similar function to the other, or alternatively have only complementary function sets). In one variant, a client-server model is utilized wherein the CUe DML acts as a server to the DUe DML clients within a given gNB 422. Moreover, while several DMLs 421 are shown, the requisite functionality required by the methods described herein may in some scenarios by supported entirely by one DML 421 alone (e.g., located in the DUe 426 or the CUe 424).

It will also be appreciated that while described primarily with respect to a unitary gNB-CU entity or device 422 as shown in FIG. 4B, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architecture of FIG. 4B. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In the 5G NR model, the DU(s) comprise logical nodes that each may include varying subsets of the gNB functions, depending on the functional split option. DU operation is controlled by the CU (and ultimately for some functions by the NG Core). Accordingly, split options between the DUe 426 and CUe 424 in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe 424 while PDCP (packet data convergence protocol), RLC (radio link control), MAC, physical layer (PHY) and RF are kept in the DUe's 426, thereby maintaining the entire user plane in the distributed unit.

Under Option 2 (PDCP/RLC split), there are two possible variants: (i) RRC, PDCP maintained in the CUe 424, while RLC, MAC, physical layer and RF are in the DUe's 426; and (ii) RRC, PDCP in the CUe 424 (with split user plane and control plane stacks), and RLC, MAC, physical layer and RF in the DUe's 426.

Under Option 3 (Intra RLC Split), two splits are possible: (i) split based on automatic repeat request (ARQ) protocols; and (ii) split based on TX RLC and RX RLC.

Under Option 4 (RLC-MAC split), RRC, PDCP, and RLC are maintained in the CUe 424, while MAC, physical layer, and RF are maintained in the DUe's 426.

Under Option 5 (Intra-MAC split), RF, physical layer and lower part of the MAC layer (Low-MAC) are in the DUe's 426, while the higher part of the MAC layer (High-MAC), RLC and PDCP are in the CUe 424.

Under Option 6 (MAC-PHY split), the MAC and upper layers are in the CUe 424, while the PHY layer and RF are in the DUe's 426. The interface between the CUe 424 and DUe's 426 carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's 426, while remaining functions reside in the CUe 424. In the DL, FFT and CP addition may reside in the DUe 426, while the remainder of the PHY resides in the CUe 424.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

The foregoing split options are intended to enable flexible hardware implementations which allow scalable cost-effective solutions, as well as coordination for e.g., performance features, load management, and real-time performance optimization. Moreover, configurable functional splits enable dynamic adaptation to various use cases and operational scenarios, including the interference detection and management scenarios described herein. Factors considered in determining how/when to implement such options can include: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation). In one such example, if a backhaul (e.g., that used in an MSO or MNO network for backhauling a premises or site to the core or other facility) operates on an unlicensed channel subject to DFS requirement, then the interferer/radar detection becomes a more urgent and important task, since disruption of the backhaul channel(s) could have significant consequences for many users of the equipment being backhauled. As such, the Options/splits selected for the various gNBs can be based on such urgency and reliability (e.g., to reduce disruption and latency to the maximum degree, and/or increase reliability to the maximum degree).

DUe Apparatus

Figure 5:
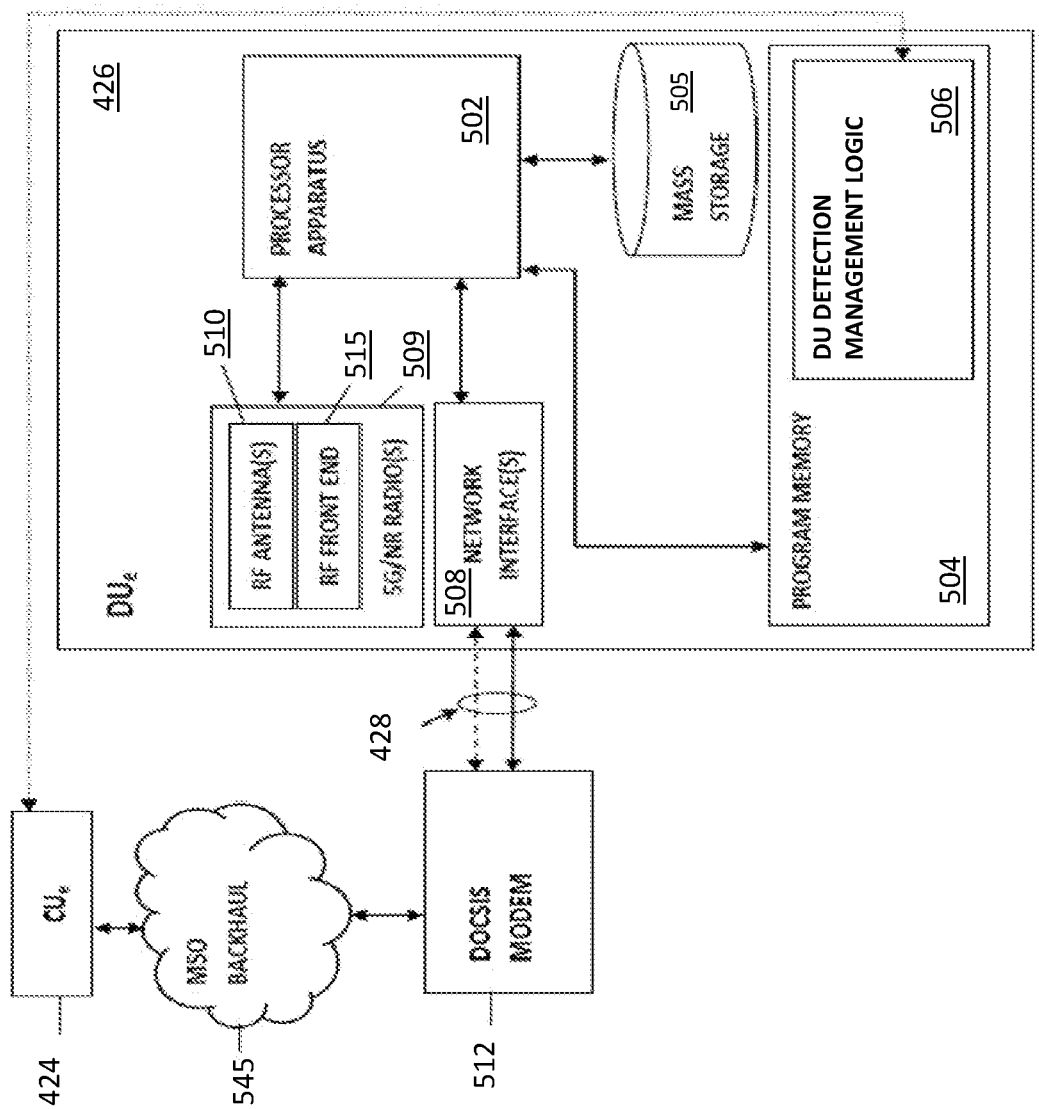
FIG. 5 is a functional block diagram illustrating a first exemplary embodiment of an enhanced distributed unit (DUe) apparatus useful with various embodiments of the present disclosure.

FIG. 5 illustrates an exemplary configuration of an enhanced distributed unit (DUe) 426 according to the present disclosure. As shown, the DUe 426 includes, inter alia, a processor apparatus or subsystem 502, a program memory module 504, mass storage 505, DML function logic 506, one or more network interfaces 508, and one or more RF (e.g., 5G/New Radio) PHY interfaces 509.

In the exemplary embodiment, the processor 502 may include one or more of a digital signal processor, microprocessor, field-programmable gate array, GPU, or plurality of processing components mounted on one or more substrates. The processor 502 may also comprise an internal cache memory, and is in communication with a memory subsystem 504, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 502.

The RF interface 509 is configured to comply with the relevant PHY standards which it supports (e.g., 5G NR RAN, E-UTRAN, WLAN such as 802.11-16, and/or others as applicable) in the area/premises/venue being served. The antenna(s) 510 of the DUe NR radio may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

The processing apparatus 502 is configured to execute at least one computer program stored in memory 504 (e.g., a non-transitory computer readable storage medium); in the illustrated embodiment, such programs include DUe detection and management controller logic (DML) 506, such as whether detection of an interfering radar has occurred or not, receipt and decode of the enhanced IEs, and other logical functions performed by the DUe 426 as described elsewhere herein. Other embodiments may implement such functionality within dedicated hardware, logic, and/or specialized co-processors (not shown). The DUe controller logic 506 is a firmware or software module that, inter alia, communicates with a corresponding CUe detection logic portion (i.e., for detection and message exchange and protocol implementation), and/or other upstream or backend entities such as those within the NG Core 403 in alternate embodiments.

In some embodiments, the DUe DML logic 506 utilizes memory 504 or other storage 505 configured to temporarily hold a number of data relating to the various IE's (including those in Tables 2-5 described previously herein) before transmission via the network interface(s) 508 to the CUe 424 or NG Core 423 (or AMF). In other embodiments, application program interfaces (APIs) such as those included in an MSO-provided application or those natively available on the DUe 426 may also reside in the internal cache or other memory 504. Such APIs may include common network protocols or programming languages configured to enable communication with the DUe 426 and other network entities (e.g., via API "calls" to the DUe by MSO network processes tasked with gathering interferer, load, configuration, or other data). Application program interfaces (APIs) may be included in an MSO-provided applications, or installed with other proprietary software or firmware that comes prepackaged with the DUe/CUe.

It will be appreciated that any number of physical configurations of the DUe 426 may be implemented consistent with the present disclosure. As noted above, the functional "split" between DUe's 426 and CUe 424 has many options, including those which may be invoked dynamically (e.g., where the functionality may reside in both one or more DUe's 426 and the corresponding CUe 424, but is only used in one or the other at a time based on e.g., operational conditions such as predicated on detected interferers which invoke new "split" logic to further optimize operation of the network, such as to result in the least interruption of service for e.g., MSO subscribers operating in the NR-U bands of interest).

CUe Apparatus

Figure 6:
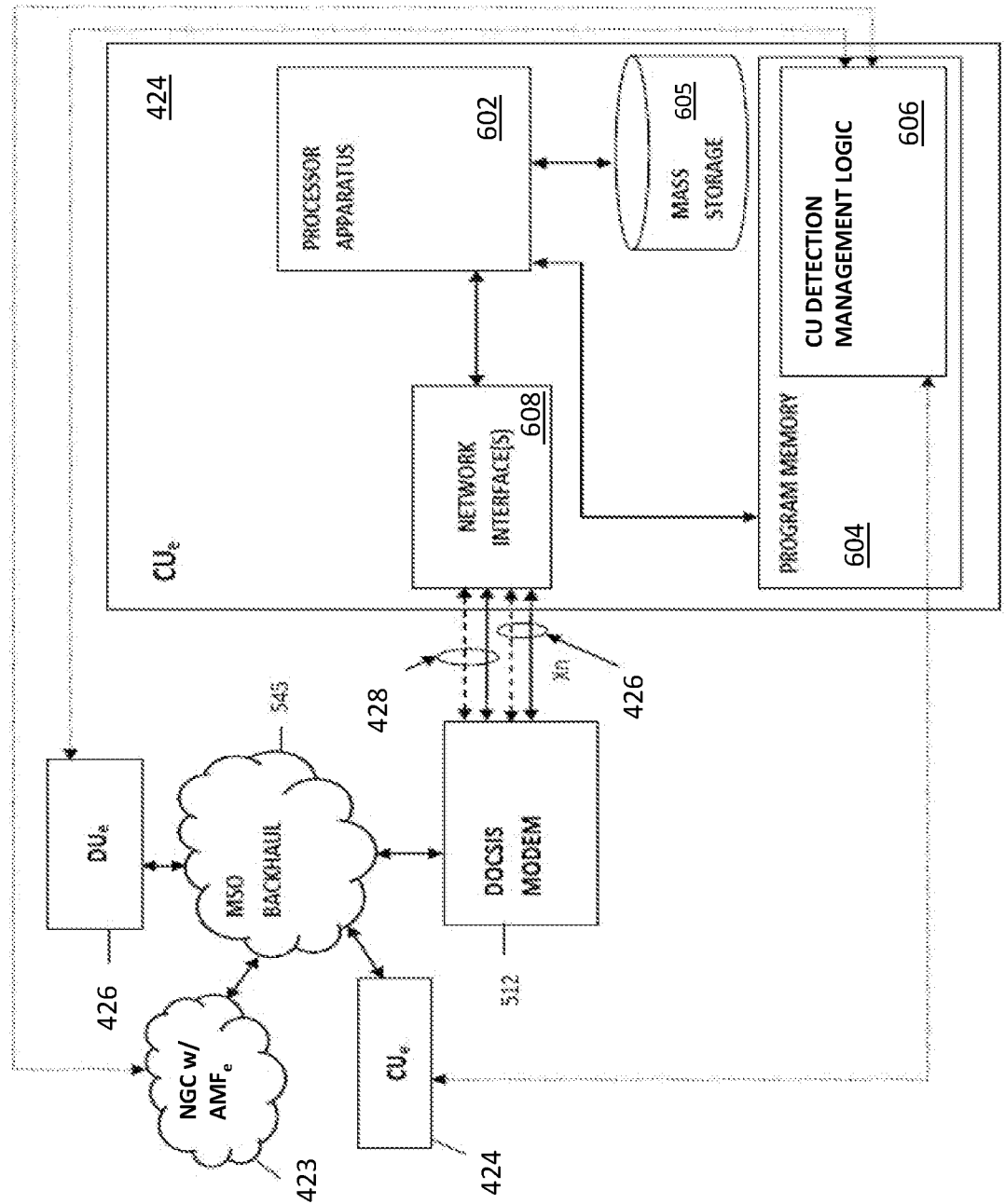
FIG. 6 is a functional block diagram illustrating a first exemplary embodiment of an enhanced central(ized) unit (CUe) apparatus useful with various embodiments of the present disclosure.

FIG. 6 illustrates a block diagram of an exemplary embodiment of a CUe 424 apparatus, useful for operation in accordance with the present disclosure.

In one exemplary embodiment as shown, the CUe 424 includes, inter alia, a processor apparatus or subsystem 602, a program memory module 604, CUe DML controller logic 606 (here implemented as software or firmware operative to execute on the processor 602), network interfaces 610 for communications and control data communication with the relevant DUe's 426, and a communication with the NG Core 423 (and AMF of the cognizant RAN), as well as with other gNBs via the Xn interfaces 426, 428.

In one exemplary embodiment, the CUe's 424 are maintained by the MSO and are each configured to utilize a non-public IP address within an IMS/Private Management Network "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet, but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a CUe "spoof" or MITM attack whereby an attacker might attempt to hijack one or more CUe to obtain data from the corresponding DUe's (or even UE's utilizing the DUe's).

Although the exemplary CUe 424 may be used as described within the present disclosure, those of ordinary skill in the related arts will readily appreciate, given the present disclosure, that the "centralized" controller unit 424 may in fact be virtualized and/or distributed within other network or service domain entities (e.g., within one of the Due 426 of a given gNB 422, within the NG Core 423 or an MSO entity such as a server, a co-located eNB, etc.), and hence the foregoing apparatus 424 of FIG. 6 is purely illustrative.

In one embodiment, the processor apparatus 602 may include one or more of a digital signal processor, microprocessor, field-programmable gate array, GPU or plurality of processing components mounted on one or more substrates. The processor apparatus 602 may also comprise an internal cache memory. The processing subsystem is in communication with a program memory module or subsystem 604, where the latter may include memory which may comprise, e.g., SRAM, flash and/or SDRAM components. The memory module 604 may implement one or more of direct memory access (DMA) type hardware, so as to facilitate data accesses as is well known in the art. The memory module of the exemplary embodiment contains one or more computer-executable instructions that are executable by the processor apparatus 602. A mass storage device (e.g., HDD or SSD, or even NAND flash or the like) is also provided as shown.

The processor apparatus 602 is configured to execute at least one computer program stored in memory 604 (e.g., the logic of the CUe including enhanced detection and management and associated IE functionality in the form of software or firmware that implements the various functions described herein). Other embodiments may implement such functionality within dedicated hardware, logic, and/or specialized co-processors (not shown).

In one embodiment, the CUe 424 is further configured to register known downstream devices (e.g., access nodes including DUe's 426, other CUe devices), and centrally control the broader gNB functions (and any constituent peer-to-peer sub-networks or meshes). Such configuration include, e.g., providing network identification (e.g., to DUe's, gNBs, client devices such as roaming MNO UEs, and other devices, or to upstream devices such as MNO or MSO NG Core portions 423 and their entities, including the AMF for the RAN to which the gNB belongs), and managing capabilities supported by the gNB's NR RAN.

The CUe 424 may further be configured to directly or indirectly communicate with one or more authentication, authorization, and accounting (AAA) servers of the network, such as via the interface 608 shown in FIG. 6. The AAA servers, whether locally maintained by the MSO or remotely by e.g., an MNO of the subscriber, are configured to provide services for, e.g., authorization and/or control of network subscribers (including roaming MNO "visitors") for controlling access and enforcing policies, auditing usage, and providing the information necessary to bill for services.

AMFe Apparatus

Figure 7:
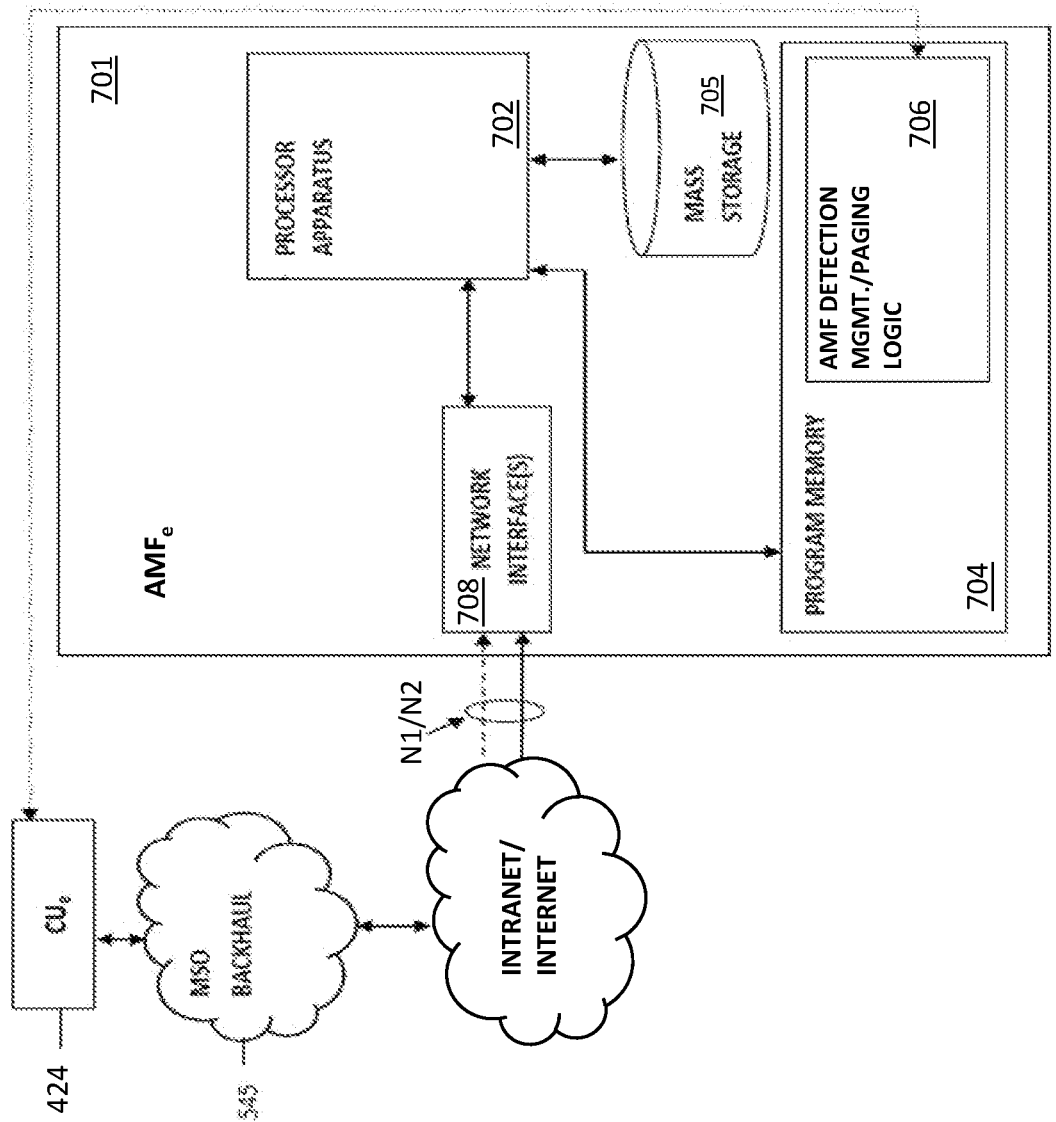
FIG. 7 is a functional block diagram illustrating a first exemplary embodiment of an enhanced 3GPP AMF (Access Management Function) (AMFe) apparatus useful with various embodiments of the present disclosure.

FIG. 7 illustrates an exemplary configuration of an enhanced AMF (AMFe) 701 according to the present disclosure. As shown, the AMFe 701 includes, inter alia, a processor apparatus or subsystem 702, a program memory module 704, mass storage 705, AMF DML function logic 706, and one or more network interfaces 708 so as to support the 3GPP N1 and N2 interface functions.

In the exemplary embodiment, the processor 702 may include one or more of a digital signal processor, microprocessor, field-programmable gate array, GPU, or plurality of processing components mounted on one or more substrates. The processor 502 may also comprise an internal cache memory, and is in communication with a memory subsystem 504, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 502.

The processing apparatus 702 is configured to execute at least one computer program stored in memory 704 (e.g., a non-transitory computer readable storage medium); in the illustrated embodiment, such programs include AMFe detection and management controller logic (DML) 706, such as whether detection of an interfering radar has occurred or not, receipt and decode of the enhanced IEs, and other logical functions performed by the AMFe 701 as described elsewhere herein (when utilized within the architecture). Other embodiments may implement such functionality within dedicated hardware, logic, and/or specialized co-processors (not shown). The AMFe controller logic 706 is a firmware or software module that, inter alia, communicates with a corresponding CUe detection logic portion (i.e., for detection and message exchange and protocol implementation), and/or other upstream or backend entities such as those further within the NG Core (see FIG. 8) as well as logical connections with UE.

In some embodiments, the DML logic 706 utilizes memory 704 or other storage 705 configured to temporarily hold a number of data relating to the various IE's (including those in Tables 2-5 described previously herein) before transmission via the network interface(s) to the CUe 424 or NG Core 423. In other embodiments, application program interfaces (APIs) may also reside in the internal cache or other memory 704. Such APIs may include common network protocols or programming languages configured to enable communication with the AMFe 701 and other network entities (e.g., via API "calls" to the AMFe by MSO network processes tasked with gathering interferer, load, configuration, or other data). Application program interfaces (APIs) may be included in an MSO-provided applications or installed with other proprietary software or firmware that comes prepackaged with the AMF hardware.

UEe Apparatus

Figure 8:
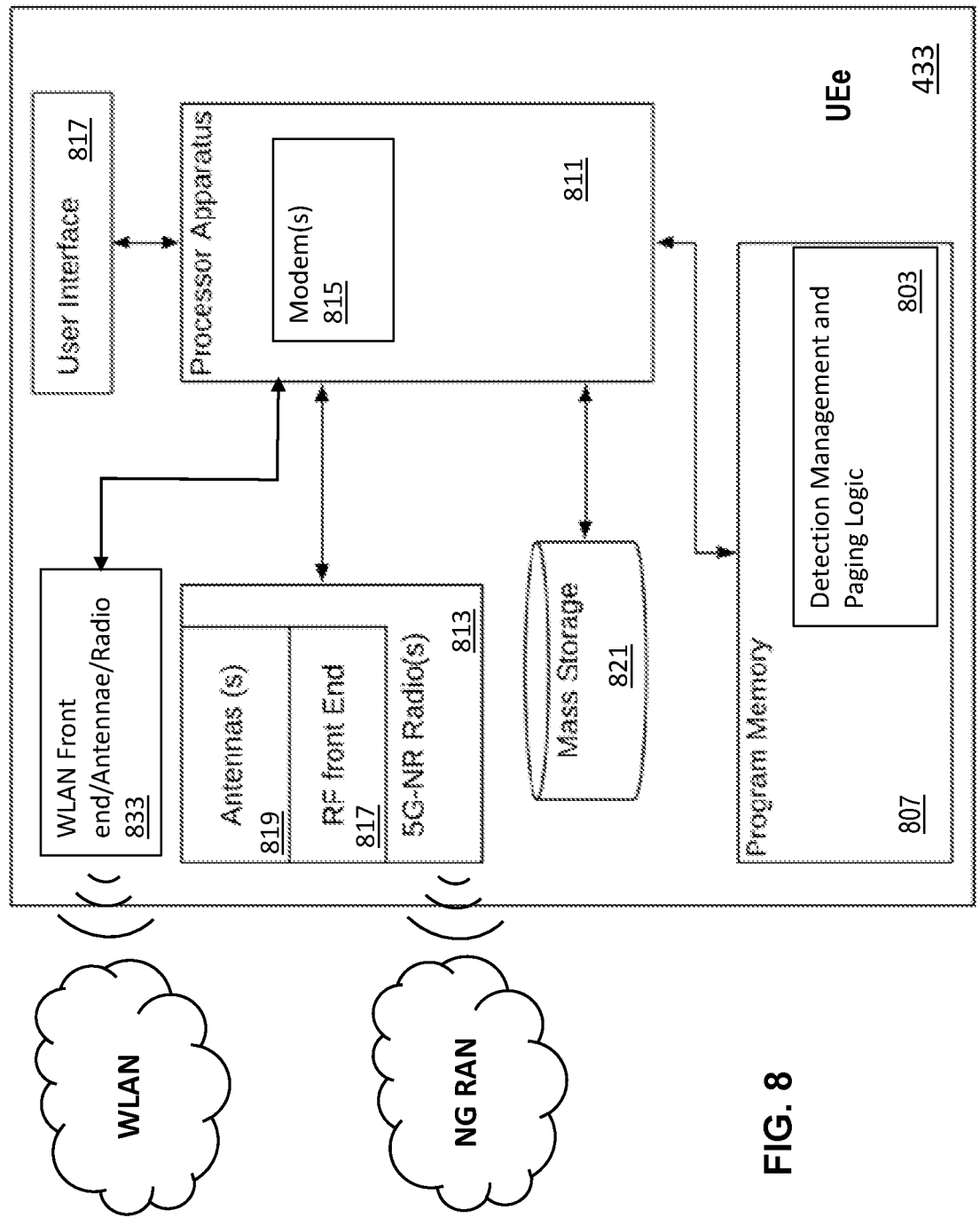
FIG. 8 is a functional block diagram illustrating a first exemplary embodiment of an enhanced User Equipment (UEe) apparatus useful with various embodiments of the present disclosure.

FIG. 8 illustrates a block diagram of an exemplary embodiment of an enhanced UE (UEe) apparatus 433, useful for operation in accordance with the present disclosure.

In one exemplary embodiment as shown, the UEe 433 includes, inter alia, a processor apparatus or subsystem 811, a program memory module 807, UE DML logic 803 (here implemented as software or firmware operative to execute on the processor 811), and wireless interface 813 for communications with the relevant RANs (e.g., 5G-NR/NR-U RAN), a user interface (UI) 817 such as a capacitive touchscreen device, and a WLAN front end/radio and associated baseband 833. The RF interfaces 813, 833 are each configured to comply with the relevant PHY standards which it supports (e.g., 3GPP Rel. 15/16/17 or IEEE Std. 802.11). The antenna(s) 819 of the UEe radios may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 811 may include one or more of a digital signal processor, microprocessor, field-programmable gate array, or plurality of processing components mounted on one or more substrates. The processor apparatus 811 may also comprise an internal cache memory, and modem 815 (e.g., baseband/MAC chipset). As indicated, the UEe includes a DML module 803 in the program memory which is in communication with the processing subsystem, where the former may include memory which may comprise, e.g., SRAM, flash and/or SDRAM components. The memory module 807 may implement one or more of direct memory access (DMA) type hardware, so as to facilitate data accesses as is well known in the art. The memory module of the exemplary embodiment contains one or more computer-executable instructions that are executable by the processor apparatus 811. A mass storage device (e.g., HDD or SSD, or NAND/NOR flash or the like, such as via eMCC) is also provided as shown.

Other embodiments may implement the DML functionality within dedicated hardware, logic, and/or specialized co-processors (not shown).

As noted, the UEe 433 may include a DML module 803 which is configured to, inter alia, (i) enable receipt of network-initiated paging messages and associated data relating to interferer (e.g., weather radar) detection; and (ii) redirect or migration messages and associated data causing the UEe 433 to move to one or more new unencumbered carriers. Moreover, in one variant, the DML logic 803 may also be configured to (iii) aid in detection of the interferer, such as by utilizing its RF front end/antennae to make environmental measurements within one or more prescribed bands, including ones which it may presently be operating in, and pass this data to the gNB (and AMF, depending on configuration). As such, the DML logic is in communication with the modem 815 (via its execution on the processor) regarding detection of interferers in unlicensed spectrum, and for utilizing of the aforementioned paging and redirection data when received from the gNB. The modem 815 processes the baseband control and data signals relating to these functions for transmission or reception as applicable via the RF frond end module 803.

In some embodiments, the UEe 433 also utilizes memory 807 or other storage 821 configured to temporarily hold a number of data relating to the various gNB associations, interfered-with or encumbered carriers, detection data (when so equipped), and other relevant data which may be received via the aforementioned IEs.

In other embodiments, application program interfaces (APIs) such as those included in an MSO-provided application or those natively available on the UEe may also reside in the internal cache or other memory 807. Such APIs may include common network protocols or programming languages configured to enable communication with the UEe 433 and other network entities (e.g., via API "calls" to the UEe by MSO network processes tasked with NR-U interference detection and carrier management).

As an aside, a downloadable application or "app" may be available to subscribers of an MSO or cable network (and/or the general public, including MSO "partner" MNO subscribers), where the app allows users to configure their UEe via the UI to implement enhanced functionality, including data collection and reporting back to the MSO core network so as to enable, inter alia, NR-U carrier interference when roaming, congestion, or other attributes which may be useful in implementing e.g., the methodologies of FIGS. 2 and 3 discussed above. Application program interfaces (APIs) may be included in MSO-provided applications, installed with other proprietary software that comes prepackaged with the UEe. Alternatively, the relevant MNO may provide its subscribers with the aforementioned functionality (e.g., as a pre-loaded app on the UEe at distribution, or later via download), or as a firmware update to the UEe stack conducted OTA.

Figure 9:
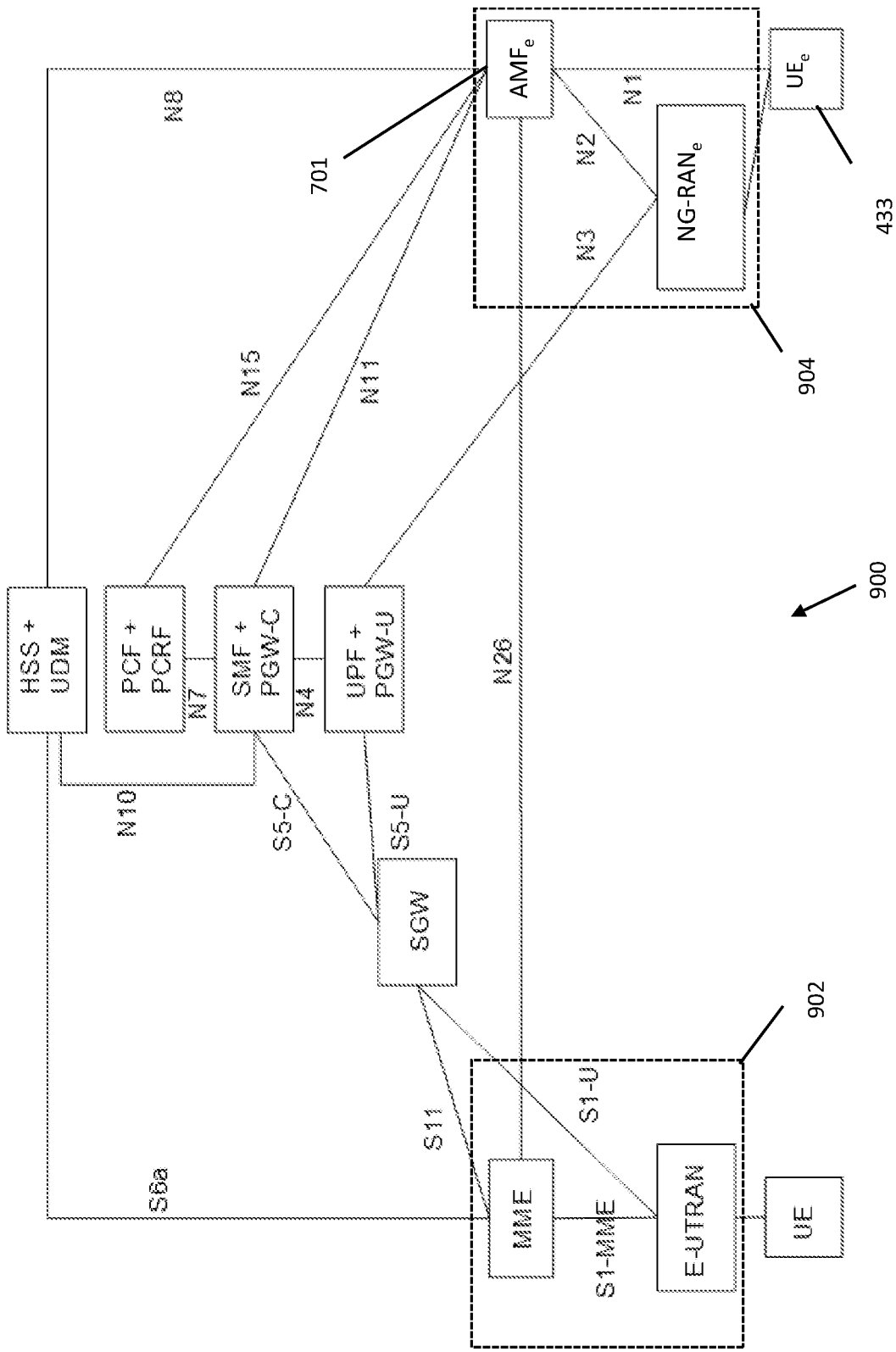
FIG. 9 is a block diagram showing one embodiment of an internetworking-enabled architecture between enhanced 5GS with radar detection and EPC/E-UTRAN according to the disclosure.

FIG. 9 shows one embodiment of an architecture 900 for interworking between the enhanced 5GS (including AMFe, enhanced gNB 422, and enhanced UE (UEe) 433 if used), and an EPC/E-UTRAN. Two different RAN technologies are supported; i.e., E-UTRAN (4G/4.5G) 902, and 5G (NG-RAN) 904, with the 5G network 904 also enabled for radar or other interferer detection and management.

Additional Embodiments

System Information Changes—

System information (SI) broadcast by a gNB can also be enhanced for the purposes of DFS. For example, System Information Block 1 (SIB1) in Rel-16 NR currently conveys uac-BarringInfo that contains cell access control parameters for different UE access categories. The UAC barring information may be enhanced with frequency redirection information such that IDLE/INACTIVE/CONNECTED UEs can obtain this information from reading SI, where the SI update is indicated via paging.

Solutions for RRC_INACTIVE UEs—

It will be recognized that the exemplary solutions for RRC_IDLE UEs can in one approach be reused for RRC_INACTIVE UEs. RRC_INACTIVE UEs may in one variant be configured to, after completing cell change to the new frequency, transmit a RAN-based Notification Area Update message that confirms the completion of the redirect procedure due to DFS.

Solutions for RRC_CONNECTED UEs—

In addition to using existing handover mechanisms for RRC_CONNECTED UEs, a new DFS event detection message is utilized in one variant of the present disclosure for, inter alia, UEs to provide assistance to the gNB with DFS. Consider the exemplary scenario of multi-radio UEs that are equipped with both Wi-Fi and 3GPP cellular radios. As previously described, IEEE Std. 802.11 technologies incorporate transmission and reception of channel switch announcement (CSA) frames in the event of radar detection. In one implementation of the present disclosure, a UE that detects such a message via its Wi-Fi radio (or yet other air interface) can report this to the NR-U gNB using an RRC message configured for such purposes. Note that in 3GPP Rel-15, measurement of IEEE WLAN RSSI based on Wi-Fi beacons is defined for UEs in any RRC state state [16], while in Rel-16, ATSSS WLAN channel utilization and beacon RSSI measurement reports have been proposed. Hence, in one variant, the RRC message referenced above is an RRC message carried on DCCH from a UE to the network. Other solutions will be appreciated by those of ordinary skill given the present disclosure.

It will also be appreciated that while there are existing handover mechanisms for RRC_CONNECTED UEs, it may be the case that the number of UEs in RRC_CONNECTED are too numerous, and utilizing such extant handover mechanism for all the UEs may require use of too many slots. Alternatively, due to limitations on channel access (e.g. listen-before-talk) and the maximum duration of transmission during a given channel access, a gNB may have to perform a channel access procedure multiple times, in which case there would be additional delay due to such repetition of the channel access procedure. In such cases, the gNB may, via its DML, logic, use a more fitting method such as announcing the channel redirection via system information, e.g. System Information Block 1 (SIB1), updating uac-BarringInfo and providing frequency redirection information.

Solutions for Indication to other gNBs—

Thus far, the present disclosure has in some aspects focused on how to indicate frequency changes resulting from or related to DFS to UEs. Notably, there are several instances where one or more gNBs may be relying on the downlink transmissions of a particular gNB for various purposes. It is beneficial in certain cases for the relied-upon gNB(s) to indicate to these relying gNBs that it has to change its operating frequency due to DFS, so that the relying gNBs can stop monitoring non-existent gNB transmissions. Several example instances of the foregoing include:

Radio interface-based synchronization (RIBS) that has been defined for LTE and is under discussion for NR as part of Rel-17. Here, downstream gNBs rely on reference signal transmissions from upstream gNBs to acquire time synchronization to a master clock.

Integrated access and backhaul (IAB), wherein a NR child node (gNB) relies on a donor or parent node (gNB) for its wireless backhaul link.

Remote interference management (RIM) in Rel-16 NR where a victim gNB listens to reference signal transmissions from an aggressor gNB to determine if RIM still persists.

For the case of IAB, in one embodiment, the SSB transmitted by the IAB donor to the IAB child nodes includes a modified PBCH payload or other element to indicate that the parent gNB is about to cease transmission.

For the case of RIM and RIBS, in one embodiment a reserved RIM-RS or RIBS-RS is transmitted to indicate to downstream gNBs that the upstream gNB is about to cease transmissions. For example, the sequence index of the reserved RIM-RS or RIBS-RS can be mapped to such an indication in the 3GPP specification.

Other solutions for the foregoing IAB, RIM and RIBS scenarios will be appreciated by those of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of managing detection of interference in a first frequency band being used in a wireless access network by a wireless access node and one or more wireless user devices connected to the wireless access network through the wireless access node, the computerized method comprising:
  detecting wireless interference associated with the first frequency band;
  based on the detecting, selecting at least one second frequency band which at least meets one or more interference-related criteria;
  determining that the one or more wireless user devices are initially in at least one of (i) an idle mode or (ii) an inactive mode;
  sending a first signal to the one or more wireless user devices to cause the one or more wireless user devices to transition from the at least one of (i) the idle mode or (ii) the inactive mode to at least one of (i) a connected mode or (ii) an active mode, wherein the first signal and the transition to the at least one of (i) the connected mode or (ii) the active mode comprises a Fifth Generation (5G) Third Generation Partnership Project (3GPP) compliant paging procedure, and the first signal is initiated by an access and mobility management function (AMF); and
  sending a second signal to the one or more wireless user devices to cause the one or more wireless user devices to switch from use of the first frequency band to use of the at least one second frequency band, wherein the sending of the second signal to the one or more wireless user devices to cause the switching to the use of the at least one second frequency band comprises using a 5G 3GPP compliant frequency change procedure.

2. The computerized method of claim 1, wherein the switching to the use of the at least one second frequency band comprises switching to use of two or more sub-bands.

3. A computerized method of managing detection of interference in a first frequency band being used in a wireless access network by a wireless access node and one or more wireless user devices connected to the wireless access network through the wireless access node, the computerized method comprising:
  detecting wireless interference associated with the first frequency band;
  based on the detecting, selecting at least one second frequency band which at least meets one or more interference-related criteria;
  determining that the one or more wireless user devices are initially in at least one of (i) an idle mode or (ii) an inactive mode;
  causing the wireless access node to send data representative of a redirect message to the one or more wireless user devices without first causing the one or more wireless user devices to transition from the at least one of (i) the idle mode or (ii) the inactive mode to at least one of (i) a connected mode or (ii) an active mode; and
  cause the one or more wireless user devices to switch from use of the first frequency band to use of the at least one second frequency band.

4. The computerized method of claim 3, wherein the causing of the wireless access node to send the data representative of the redirect message to the one or more wireless user devices comprises causing the wireless access node to send data configured to signal the one or more wireless user devices to switch their connection to the wireless access network from the first frequency band to the at least one second frequency band.

5. The computerized method of claim 3, further comprising causing the one or more wireless user devices to monitor a physical redirect channel for the data representative of the redirect message.

6. The computerized method of claim 5, wherein the causing the one or more wireless user devices to monitor the physical redirect channel for the data representative of the redirect message comprises causing the one or more wireless user devices to monitor the physical redirect channel for the data representative of the redirect message while in the at least one of (i) the idle mode or (ii) the inactive mode.

7. The computerized method of claim 5, wherein the causing the one or more wireless user devices to monitor the physical redirect channel for the data representative of the redirect message comprises causing the one or more wireless user devices to monitor the physical redirect channel for the data representative of the redirect message periodically at a predetermined monitoring frequency, the predetermined monitoring frequency based at least on a frequency of monitoring of a paging channel.

8. The computerized method of claim 5, wherein the causing the one or more wireless user devices to monitor the physical redirect channel for the data representative of the redirect message comprises causing the one or more wireless user devices to monitor the physical redirect channel for the data representative of the redirect message periodically at a predetermined monitoring frequency, wherein the predetermined monitoring frequency is based at least on historical interference data.

9. The computerized method of claim 8, further comprising obtaining the historical interference data, the historical interference data comprising a number of times that interference is detected in the first frequency band within a time period.

10. A wireless network access node configured to provide wireless network access to one or more wireless user devices within a wireless access network via use of unlicensed frequency spectrum, the wireless network access node comprising:
  a digital processor apparatus;
  a wireless network interface in data communication with the digital processor apparatus; and
  a computer readable storage medium in data communication with the digital processor apparatus, the computer readable storage medium comprising at least one computer program configured to, when executed on the digital processor apparatus, cause the wireless network access node to:
    perform interference detection for at least one first frequency;
    based on the interference detection, select at least one second frequency; and
    cause redirect of the one or more wireless user devices from use of the at least one first frequency to use of the at least one second frequency;
  wherein:
    the one or more wireless user devices are initially in at least one of an idle or inactive state;
    the at least one first frequency and the at least one second frequency are in the unlicensed frequency spectrum;
    the unlicensed frequency spectrum is part of a Fifth Generation (5G) Third Generation Partnership Project (3GPP) New Radio-Unlicensed (NR-U) spectrum; and
    the wireless access network is at least in part working in NR-U standalone deployment.

11. A wireless network access node configured to provide wireless network access to one or more wireless user devices within a wireless access network via use of unlicensed frequency spectrum, the wireless network access node comprising:
   a digital processor apparatus;
   a wireless network interface in data communication with the digital processor apparatus; and
   a computer readable storage medium in data communication with the digital processor apparatus, the computer readable storage medium comprising at least one computer program configured to, when executed on the digital processor apparatus, cause the wireless network access node to:
      perform interference detection for at least one first frequency;
      based on the interference detection, select at least one second frequency; and
      cause redirect of the one or more wireless user devices from use of the at least one first frequency to use of the at least one second frequency;
   wherein:
      the one or more wireless user devices are initially in at least one of an idle or inactive state;
      the at least one first frequency and the at least one second frequency are in the unlicensed frequency spectrum; and
      the wireless network access node comprises a Third Generation Partnership Project (3GPP) New Radio (NR) gNB comprising at least one of (i) an enhanced central unit (CUe) or (ii) at least one enhanced distributed unit (DUe) in data communication with the CUe.

12. The wireless network access node of claim 11, wherein:
   the interference detection is performed by the at least one DUe; and
   the selection of the at least one second frequency is performed by the CUe.

13. A wireless network access node configured to provide wireless network access to one or more wireless user devices within a wireless access network via use of unlicensed frequency spectrum, the wireless network access node comprising:
   a digital processor apparatus;
   a wireless network interface in data communication with the digital processor apparatus; and
   a non-transitory computer readable storage medium in data communication with the digital processor apparatus, the non-transitory computer readable storage medium including at least one computer program configured to, when executed on the digital processor apparatus, cause the wireless network access node to:
      perform interference detection for at least one first frequency;
      send data representative of a RAN (radio access network) configuration update to an AMF (access and mobility management function) in a 5G Core (5GC), the data representative of a RAN configuration update comprising data related to the interference detection;
      based on the interference detection, select at least one second frequency; and
      cause redirect of the one or more wireless user devices from use of the at least one first frequency to use of the at least one second frequency;
   wherein:
      the one or more wireless user devices are initially in at least one of an idle or inactive state; and
      the at least one first frequency and the at least one second frequency are in the unlicensed frequency spectrum.

14. The wireless network access node of claim 13, where the selection of the at least one second frequency comprises evaluating a plurality of pre-selected frequency bands with respect to interference.

15. The wireless network access node of claim 14, wherein the plurality of pre-selected frequency bands is based at least in part on historical interference data.

16. A wireless network access node configured to provide wireless network access to one or more wireless user devices within a wireless access network via use of unlicensed frequency spectrum, the wireless network access node comprising:
   a digital processor apparatus;
   a wireless network interface in data communication with the digital processor apparatus; and
   a non-transitory computer readable storage medium in data communication with the digital processor apparatus, the non-transitory computer readable storage medium including at least one computer program configured to, when executed on the digital processor apparatus, cause the wireless network access node to:
      perform interference detection for at least one first frequency;
      based on the interference detection, select at least one second frequency, the selection of the at least one second frequency comprising (i) receipt of a predetermined data structure of alternate frequencies and (ii) identification of an unoccupied frequency from the predetermined data structure of the alternate frequencies; and
      cause redirect of the one or more wireless user devices from use of the at least one first frequency to use of the at least one second frequency;
   wherein:
      the one or more wireless user devices are initially in at least one of an idle or inactive state; and
      the at least one first frequency and the at least one second frequency are in the unlicensed frequency spectrum.

17. The wireless network access node of claim 16, wherein:
   the wireless network access node comprises a Wi-Fi access point (AP); and
   the unlicensed frequency spectrum comprises a wireless spectrum used by Wi-Fi systems.

18. The wireless network access node of claim 16, wherein the unlicensed frequency spectrum comprises a New Radio-Unlicensed (NR-U) spectrum.

19. Computer readable apparatus comprising a non-transitory storage medium, the non-transitory storage medium comprising at least one computer program having a plurality of instructions, the plurality of instructions configured to, when executed on a processing apparatus, cause a wireless user device to:
   obtain first data representative of detection of channel interference, the detection comprising detection of one or more radar signals in a frequency or frequency band being used by the wireless user device;
   monitor a redirect channel for second data representative of a redirect message, the monitoring of the redirect channel for the second data representative of the redirect message comprising a monitoring of the redirect channel periodically at a predetermined monitoring frequency, the predetermined monitoring frequency established via use of interference data relating to a time period prior to a then-current time, the interference data enabling at least one of (i) minimization of wireless user device power consumption, or (ii) discovery by the wireless user device of the second data within a certain time period; and based at least on the first data and the second data, perform a channel frequency redirect from the frequency or frequency band to at least one other frequency or frequency band.

20. The computer readable apparatus of claim 19, wherein the monitoring of the redirect channel for the second data comprises monitoring the redirect channel while the wireless user device is in at least one of (i) an idle mode or (ii) an inactive mode.

* * * * *